(12) United States Patent
Walsh et al.

(10) Patent No.: US 10,202,271 B2
(45) Date of Patent: Feb. 12, 2019

(54) FUEL VERIFICATION SYSTEM

(71) Applicant: Franklin Fueling Systems, Inc., Madison, WI (US)

(72) Inventors: Jay Jerard Walsh, Verona, WI (US); Lisa Marie O'Leary, McFarland, WI (US); Bill Nelson, Sun Prairie, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 433 days.

(21) Appl. No.: 14/823,361

(22) Filed: Aug. 11, 2015

(65) Prior Publication Data

US 2016/0039656 A1 Feb. 11, 2016

Related U.S. Application Data

(60) Provisional application No. 62/042,145, filed on Aug. 26, 2014, provisional application No. 62/036,077, filed on Aug. 11, 2014.

(51) Int. Cl.
*G05D 7/00* (2006.01)
*B67D 7/04* (2010.01)
(Continued)

(52) U.S. Cl.
CPC ............ *B67D 7/04* (2013.01); *B67D 7/3209* (2013.01); *B67D 7/78* (2013.01); *B67D 7/86* (2013.01);
(Continued)

(58) Field of Classification Search
CPC .................................................. A01M 7/0089
(Continued)

(56) References Cited

U.S. PATENT DOCUMENTS

| 4,576,197 A | 3/1986 | Kempers |
| 5,376,215 A * | 12/1994 | Ohta ................. G01B 11/0683 |
| | | 156/345.24 |

(Continued)

FOREIGN PATENT DOCUMENTS

| EP | 2320286 A1 | 5/2011 |
| GB | 2449947 A | 12/2008 |

(Continued)

OTHER PUBLICATIONS

The Total System Solution / Fuel Management Systems brochure, 5 pages, Sep. 2012, Franklin Fueling Systems.

(Continued)

*Primary Examiner* — Suresh Suryawanshi
(74) *Attorney, Agent, or Firm* — Faegre Baker Daniels LLP

(57) ABSTRACT

Fuel management systems for a fuel dispensing facility including a fuel delivery system are disclosed. The fuel delivery system includes at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system. The fuel management system may include installation records of the fuel handling components. The fuel management system may monitor cameras positioned in sumps of the fuel delivery system. The fuel delivery system may include a camera positioned to monitor an interior of a sump, the interior of the sump being provided by a sump basin and a sump cover. The sump cover may be a sump lid. The sump cover may be a dispenser. The (Continued)

sump cover may be another portion of the fuel delivery system.

21 Claims, 28 Drawing Sheets

(51) Int. Cl.
  *G05B 15/02* (2006.01)
  *B67D 7/32* (2010.01)
  *B67D 7/78* (2010.01)
  *B67D 7/86* (2010.01)
  *B67D 7/68* (2010.01)

(52) U.S. Cl.
  CPC .............. *G05B 15/02* (2013.01); *B67D 7/68* (2013.01); *B67D 2007/0463* (2013.01); *B67D 2007/0465* (2013.01)

(58) Field of Classification Search
  USPC ........................................................ 700/283
  See application file for complete search history.

(56) References Cited

U.S. PATENT DOCUMENTS

| | | | | |
|---|---|---|---|---|
| 6,175,382 B1* | 1/2001 | Mohr | ..................... | H04N 7/181 348/143 |
| 6,935,161 B2* | 8/2005 | Hutchinson | .......... | B67D 7/3209 73/40.5 R |
| 7,104,278 B2* | 9/2006 | Hutchinson | .......... | B67D 7/3209 137/312 |
| 7,913,856 B2* | 3/2011 | Hilsman | ................... | B60P 3/14 210/134 |
| 9,221,385 B2* | 12/2015 | Ford | ........................ | B60Q 1/00 |
| 9,428,375 B2* | 8/2016 | Sabo | .................... | B67D 7/3281 |
| 2015/0153212 A1* | 6/2015 | Cipullo | ................. | G01F 23/292 382/203 |
| 2017/0145666 A1* | 5/2017 | Kochan, Jr. | ............... | E03B 5/02 |

FOREIGN PATENT DOCUMENTS

| | | |
|---|---|---|
| GB | 2477773 A | 8/2011 |
| JP | H1172692 A | 3/1999 |
| JP | 2005322009 A | 11/2005 |
| JP | 2009000619 A | 1/2009 |
| WO | WO00/24131 | 4/2000 |
| WO | WO 00/42522 | 7/2000 |
| WO | WO 2012103498 A2 * | 8/2012 ............... B67D 7/04 |
| WO | WO 2012/103498 A2 | 8/2013 |

OTHER PUBLICATIONS

The Total System Solution / The Industry's Most Comprehensive Product Offering brochure, 6 pages, Feb. 2013, Franklin Fueling Systems.
Gilbarco Veeder-Root Encore Installation Manual MDE-3985AA, 142 pages, © 2014, Gilbarco, Inc.
Fuel Management Systems Global Product Catalog, 64 pages, Mar. 2014, Franklin Fueling Systems.
Franklin Fueling Systems Product Catalog, 387 pages, Mar. 2014, Franklin Fueling Systems.
Cyclops/Redbox Gives You Real Time Control of Joint Integrity brochure, 1 page, Control Point, support@jointmanager.com, (available at least by Jul. 22, 2014).
Controlling Operator Access to Your Butt Fusion and Electrofusion Machines brochure, 1 page, Fusion, Neakins@fusionsprovidea.com. (available at least by Jul. 22, 2014).
Joint Manager Securely Manage Your Electrofusion and Butt Fusion Joint Information Online brochure, 1 page, Joint Manager, support@jointmanager.com, (available at least by Jul. 22, 2014).
Control Point On-Site Security brochure, 2 pages, Control Point, enquiries@jointmanager.com, (available at least by Jul. 22, 2014).
Control Point Real Time brochure, 4 pages, Control Point, enquiries@jointmanager.com, (available at least by Jul. 22, 2014).
Control Point Asset Integrity brochure, 2 pages, Control Point, enquiries@jointmanager.com, (available at least by Jul. 22, 2014).
Control Point Joint Integrity brochure, 4 pages Control Point, enquiries@jointmanager.com, (available at least by Jul. 22, 2014).
Control Point Continuous Improvement brochure, 2 pages, Control Point, enquiries@jointmanager.com, (available at least by Jul. 22, 2014).
Control Point Data Management brochure, 4 pages, Joint Manager, enquiries@jointmanager.com, (available at least by Jul. 22, 2014).
PCT/US2015/044615, PCT Invitation to Pay Additional Fees and Annex to Form PCT/ISA/206, Communication Relating to the Results of the Partial International Search, dated Nov. 2, 2015, 7 pages.
International Preliminary Report on Patentability for PCT/US2015/044615, dated Feb. 14, 2017, 13 pages.
Office Action issued in Chinese Application No. 201580042869.5, dated Oct. 17, 2018 (9 pages).

* cited by examiner

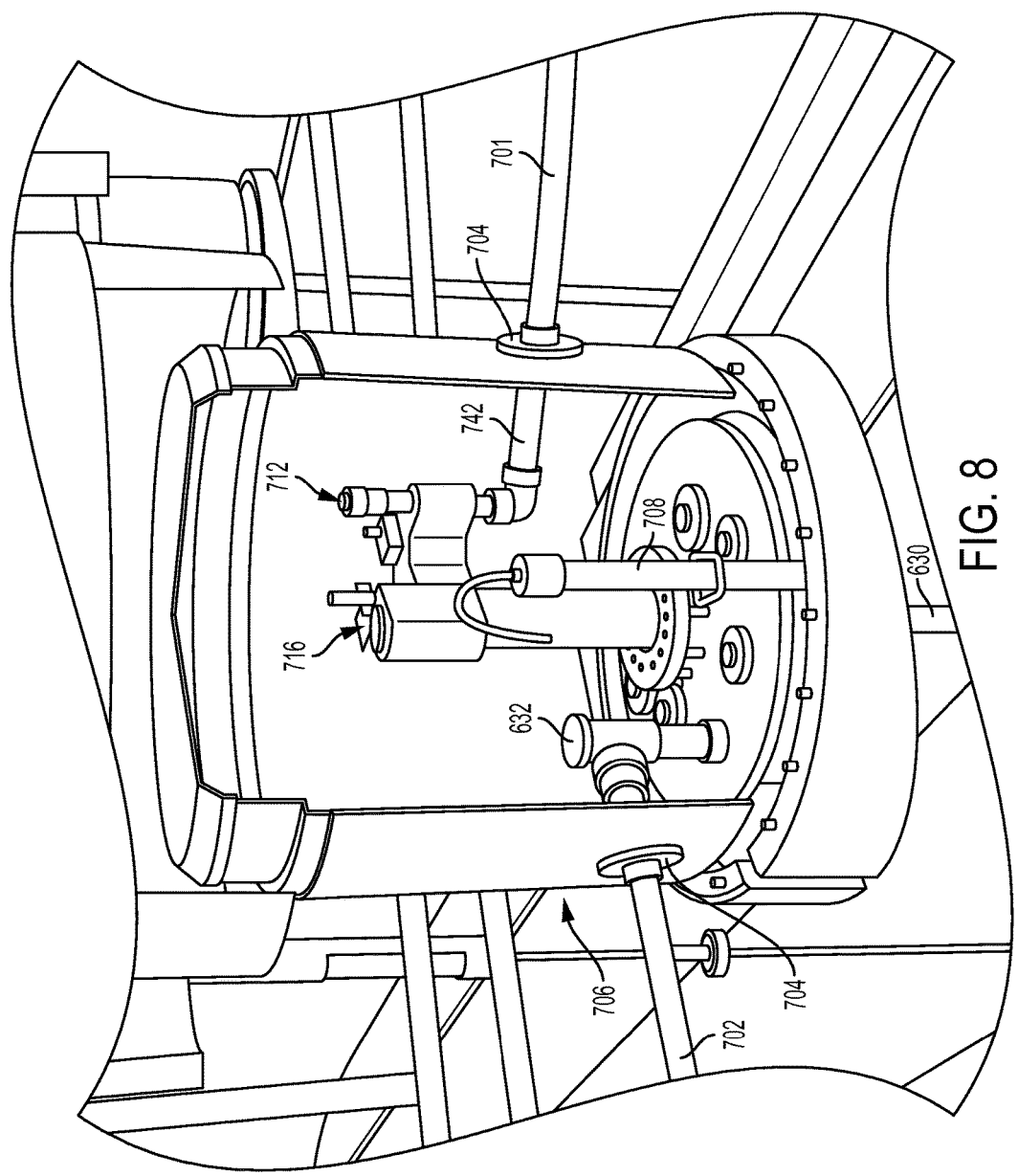

FUEL VERIFICATION SYSTEM

RELATED APPLICATIONS

This application claims the benefit of U.S. Provisional Application Ser. No. 62/036,077, filed Aug. 11, 2014, titled FUEL VERIFICATION SYSTEM, and of U.S. Provisional Application Ser. No. 62/042,145, filed Aug. 26, 2014, titled FUEL VERIFICATION SYSTEM, the entire disclosures of which are expressly incorporated by reference herein.

FIELD

The present invention relates to a method and apparatus for verifying proper installation of a fuel handling system of a fuel delivery management system.

SUMMARY

In an exemplary embodiment of the present disclosure, a fuel management system for a fuel dispensing facility including a fuel delivery system is provided. The fuel delivery system having at least one fuel storage tank configured to contain a fuel, at least one dispenser configured to receive the fuel from the at least one fuel storage tank, and a fuel handling system which is configured to one of (1) deliver the fuel to the at least one storage tank, (2) receive the fuel from the at least one fuel storage tank, (3) monitor for a leak within the fuel delivery system, and (4) monitor for a fuel inventory within the fuel delivery system. The fuel management system comprising a control system operatively coupled to the fuel delivery system to monitor a status of the fuel delivery system. The control system including a controller, a memory, and an user interface, wherein the controller provides through the user interface an installation record of the fuel handling system stored on the memory. In one example, the controller receives the installation record over a network from a server located remote from the fuel dispensing facility. In another example, the installation record comprises one or more images of the fuel dispensing delivery system. In a variation thereof, the one or more images are provided from a camera positioned to capture a picture of an interior of a sump of the fuel delivery system. In another variation thereof, the one or more images are provided to controller in a non-alterable manner. In yet another variation, the one or more images comprise a first image taken prior to a service being performed on the fuel delivery system and a second image taken after the service is performed on the fuel delivery system. In still another variation, the installation record further comprises date and time data associated with the one or more images. In yet still another variation, the installation record further comprises global-positioning system data associated with the one or more images, the controller configured to confirm a geographic location of the image based on the global-positioning system data. In a further example, the installation record comprises one or more permits or other regulatory documents indicating approval of an installation of the fuel delivery system. In still a further example, the controller is configured to record information received through the user interface and relating to the installation record. In yet another example, the controller receives maintenance information for the fuel delivery system through the user interface. In still yet another example, the control system includes a console mounted at the fuel dispensing facility. In a further example, the fuel storage tank is positioned underground.

In another exemplary embodiment of the present disclosure, an installation system for a fuel dispensing facility including a fuel delivery system is provided. The fuel delivery system having at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system. The installation system comprising at least one input module; a controller operatively coupled to the input module; at least one output module operatively coupled to the controller, the controller being configured to receive at least one installation image of the fuel handling system installed at the fuel dispensing facility, to receive a first fuel handling system approval indication with the at least one input module, to provide a second fuel handling system approval indication with the at least one output module; and to generate an installation record for the fuel handling system. In one example, the controller is further configured to receive a site plan of the fuel delivery system with the at least one input module, to receive a first site plan approval indication with the at least one input module, to provide a second site plan approval indication with the at least one output module. In another example, the controller is further configured to receive an identifier of the installer of the fuel handling system with the at least one input module, the installation record for the fuel handling system including an indication of the installer. In still another example, the at least one installation image comprises an image of a sump of the fuel delivery system. In yet still another example, the controller is configured to receive a sequence of installation steps to be completed in a sequential order, and wherein the at least one installation image is associated with one installation step of the sequence of installation steps. In a variation thereof, the controller is configured to determine a current step of the sequence of installation steps, the controller determining whether the current step and the step associated with the at least one installation image correspond to the sequential order of the sequence of installation steps.

In a further exemplary embodiment of the present disclosure, a sump for a fuel dispensing facility is provided. The fuel dispensing facility including a fuel delivery system having at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system. The sump comprising a sump base including at least one wall; a sump cover positioned over the sump base, the sump base and the sump cover cooperating to provide a sump interior; a sensor positioned to monitor the sump interior for an intrusion of a fluid into the sump interior; and a camera positioned to capture an image of the sump interior. In one example, the camera captures a first image at a first instance of time and a second image at a second image of time, the second instance of time being subsequent to the first instance of time. In another example, the camera captures a plurality of images at a plurality of spaced apart time intervals. In yet another example, the camera captures a first image at a first instance of time in response to the sensor detecting the intrusion of the fluid into the sump interior. In still another example, the sump further comprises a controller in communication with the sensor and an alarm, wherein the controller is configured to activate the alarm in response to the sensor detecting the intrusion of the fluid into the sump interior. In yet still another example, the sump further comprises a second sensor monitoring an environmental characteristic, wherein the camera captures a first image in response to the second sensor detecting a change in the environmental characteristic. In a variation thereof, the sump further comprises a controller in communication with the second sensor and an alarm, wherein the controller is configured to activate the alarm in response to the second sensor detecting the change in the environmental characteristic. In another example, the sump further comprises an illumination device positioned to illuminate the sump interior when the camera captures the image. In still another example, wherein the image captured by the camera is communicated to a control system operatively coupled to the fuel delivery system, the control system monitoring a status of the fuel delivery system. The control system including a controller, a memory storing the image captured by the camera, and an user interface, wherein the controller provides through the user interface the image captured by the camera stored on the memory.

In yet a further exemplary embodiment of the present disclosure, a method of monitoring a sump of a fuel delivery system is provided. The sump including a sump base including at least one wall and a sump cover positioned over the sump base, the sump base and the sump cover cooperating to provide a sump interior. The method comprising the steps of positioning a camera to capture an image of the sump interior while the sump cover is positioned over the sump base; capturing a first image of the sump interior with the camera; and sending the first image to a controller for viewing on a display. In one example, the step of capturing the first image of the sump interior with the camera is performed in response to sensing a fluid intrusion into the sump interior. In a variation thereof, the method further comprises activating an alarm in response sensing the fluid intrusion of the fluid into the sump interior. In another example, the step of capturing the first image of the sump interior with the camera is performed in response to an expiration of a first time period.

In still yet a further exemplary embodiment of the present disclosure, a fuel management system for a fuel dispensing facility including a fuel delivery system is provided. The fuel delivery system having at least one fuel storage tank configured to contain a fuel, at least one dispenser configured to receive the fuel from the at least one fuel storage tank, and a fuel handling system which is configured to one of (1) deliver the fuel to the at least one storage tank, (2) receive the fuel from the at least one fuel storage tank, and (3) monitor for a leak within the fuel delivery system, and (4) monitor for a fuel inventory within the fuel delivery system. The fuel management system comprising a control system operatively coupled to the fuel delivery system to monitor a status of the fuel delivery system. The control system including a controller, a memory including at least one record selected from an installation record of the fuel dispensing facility and a maintenance record of the fuel dispensing facility, and an alarm, wherein the alarm is configured to provide the at least one record to a predetermined user upon activation of the alarm; wherein the controller is configured to activate the alarm in response to an abnormal operation of the fuel delivery system. In one example, the at least one record comprises one or more images of the fuel delivery system. In another example, the at least one record includes an installation record. In a variation thereof, the installation record includes an image of a first portion of the fuel delivery system, the first portion of the fuel delivery system being identified by the controller as related to the alarm. In another variation thereof, the at least one record further includes a maintenance record. In yet another variation thereof, the maintenance record includes an image of a first portion of the fuel delivery system, the first portion of the fuel delivery system being identified by the controller as related to the alarm.

The above and other features of the present disclosure, which alone or in any combination may comprise patentable subject matter, will become apparent from the following description and the attached drawings.

BRIEF DESCRIPTION OF THE DRAWINGS

The above-mentioned and other features of the invention, and the manner of attaining them, will become more apparent and will be better understood by reference to the following description of embodiments of the disclosure taken in conjunction with the accompanying drawings, wherein:

FIG. 8 is a perspective, partial section view of a fuel tank sump of the fuel dispensing facility shown in FIG. 6, shown mounted above an underground fuel storage tank;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE DRAWINGS

Figure 1:
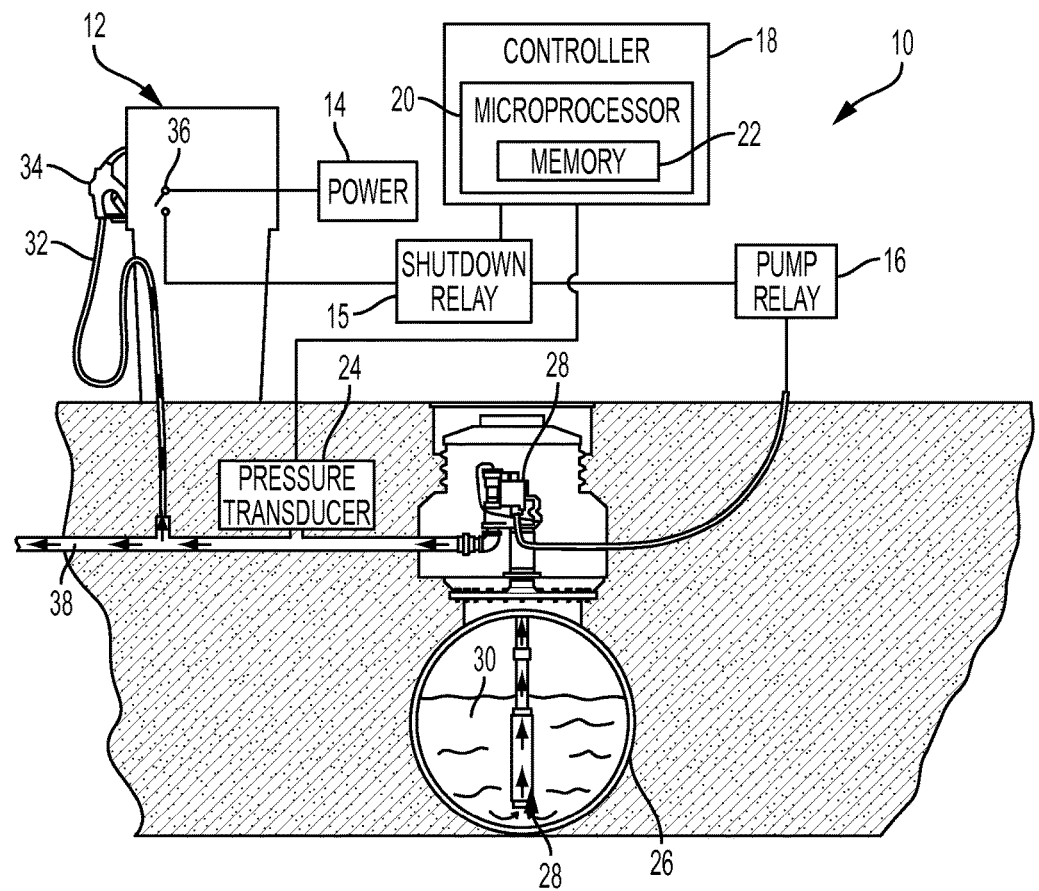
FIG. 1 illustrates a representative view of an exemplary fuel delivery management system according to one embodiment.

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

In an exemplary embodiment of the present disclosure, a fuel management system for a fuel dispensing facility including a fuel delivery system is provided. The fuel delivery system having at least one fuel storage tank configured to contain a fuel, at least one dispenser configured to receive the fuel from the at least one fuel storage tank, and a fuel handling system which is configured to one of (1) deliver the fuel to the at least one storage tank, (2) receive the fuel from the at least one fuel storage tank, (3) monitor for a leak within the fuel delivery system, and (4) monitor for a fuel inventory within the fuel delivery system. The fuel management system comprising a control system operatively coupled to the fuel delivery system to monitor a status of the fuel delivery system. The control system including a controller, a memory, and an user interface, wherein the controller provides through the user interface an installation record of the fuel handling system stored on the memory. In one example, the controller receives the installation record over a network from a server located remote from the fuel dispensing facility. In another example, the installation record comprises one or more images of the fuel dispensing delivery system. In a variation thereof, the one or more images are provided from a camera positioned to capture a picture of an interior of a sump of the fuel delivery system. In another variation thereof, the one or more images are provided to controller in a non-alterable manner. In yet another variation, the one or more images comprise a first image taken prior to a service being performed on the fuel delivery system and a second image taken after the service is performed on the fuel delivery system. In still another variation, the installation record further comprises date and time data associated with the one or more images. In yet still another variation, the installation record further comprises global-positioning system data associated with the one or more images, the controller configured to confirm a geographic location of the image based on the global-positioning system data. In a further example, the installation record comprises one or more permits or other regulatory documents indicating approval of an installation of the fuel delivery system. In still a further example, the controller is configured to record information received through the user interface and relating to the installation record. In yet another example, the controller receives maintenance information for the fuel delivery system through the user interface. In still yet another example, the control system includes a console mounted at the fuel dispensing facility. In a further example, the fuel storage tank is positioned underground.

In another exemplary embodiment of the present disclosure, an installation system for a fuel dispensing facility including a fuel delivery system is provided. The fuel delivery system having at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system. The installation system comprising at least one input module; a controller operatively coupled to the input module; at least one output module operatively coupled to the controller, the controller being configured to receive at least one installation image of the fuel handling system installed at the fuel dispensing facility, to receive a first fuel handling system approval indication with the at least one input module, to provide a second fuel handling system approval indication with the at least one output module; and to generate an installation record for the fuel handling system. In one example, the controller is further configured to receive a site plan of the fuel delivery system with the at least one input module, to receive a first site plan approval indication with the at least one input module, to provide a second site plan approval indication with the at least one output module. In another example, the controller is further configured to receive an identifier of the installer of the fuel handling system with the at least one input module, the installation record for the fuel handling system including an indication of the installer. In still another example, the at least one installation image comprises an image of a sump of the fuel delivery system. In yet still another example, the controller is configured to receive a sequence of installation steps to be completed in a sequential order, and wherein the at least one installation image is associated with one installation step of the sequence of installation steps. In a variation thereof, the controller is configured to determine a current step of the sequence of installation steps, the controller determining whether the current step and the step associated with the at least one installation image correspond to the sequential order of the sequence of installation steps.

In a further exemplary embodiment of the present disclosure, a sump for a fuel dispensing facility is provided. The fuel dispensing facility including a fuel delivery system having at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system. The sump comprising a sump base including at least one wall; a sump cover positioned over the sump base, the sump base and the sump cover cooperating to provide a sump interior; a sensor positioned to monitor the sump interior for an intrusion of a fluid into the sump interior; and a camera positioned to capture an image of the sump interior. In one example, the camera captures a first image at a first instance of time and a second image at a second image of time, the second instance of time being subsequent to the first instance of time. In another example, the camera captures a plurality of images at a plurality of spaced apart time intervals. In yet another example, the camera captures a first image at a first instance of time in response to the sensor detecting the intrusion of the fluid into the sump interior. In still another example, the sump further comprises a controller in communication with the sensor and an alarm, wherein the controller is configured to activate the alarm in response to the sensor detecting the intrusion of the fluid into the sump interior. In yet still another example, the sump further comprises comprising a second sensor monitoring an environmental characteristic, wherein the camera captures a first image in response to the second sensor detecting a change in the environmental characteristic. In a variation thereof, the sump further comprises a controller in communication with the second sensor and an alarm, wherein the controller is configured to activate the alarm in response to the second sensor detecting the change in the environmental characteristic. In another example, the sump further comprises an illumination device positioned to illuminate the sump interior when the camera captures the image. In still another example, wherein the image captured by the camera is communicated to a control system operatively coupled to the fuel delivery system, the control system monitoring a status of the fuel delivery system. The control system including a controller, a memory storing the image captured by the camera, and an user interface, wherein the controller provides through the user interface the image captured by the camera stored on the memory.

In yet a further exemplary embodiment of the present disclosure, a method of monitoring a sump of a fuel delivery system is provided. The sump including a sump base including at least one wall and a sump cover positioned over the sump base, the sump base and the sump cover cooperating to provide a sump interior. The method comprising the steps of positioning a camera to capture an image of the sump interior while the sump cover is positioned over the sump base; capturing a first image of the sump interior with the camera; and sending the first image to a controller for viewing on a display. In one example, the step of capturing the first image of the sump interior with the camera is performed in response to sensing a fluid intrusion into the sump interior. In a variation thereof, the method further comprises activating an alarm in response sensing the fluid intrusion of the fluid into the sump interior. In another example, the step of capturing the first image of the sump interior with the camera is performed in response to an expiration of a first time period.

In still yet a further exemplary embodiment of the present disclosure, a fuel management system for a fuel dispensing facility including a fuel delivery system is provided. The fuel delivery system having at least one fuel storage tank configured to contain a fuel, at least one dispenser configured to receive the fuel from the at least one fuel storage tank, and a fuel handling system which is configured to one of (1) deliver the fuel to the at least one storage tank, (2) receive the fuel from the at least one fuel storage tank, and (3) monitor for a leak within the fuel delivery system, and (4) monitor for a fuel inventory within the fuel delivery system. The fuel management system comprising a control system operatively coupled to the fuel delivery system to monitor a status of the fuel delivery system. The control system including a controller, a memory including at least one record selected from an installation record of the fuel dispensing facility and a maintenance record of the fuel dispensing facility, and an alarm, wherein the alarm is configured to provide the at least one record to a predetermined user upon activation of the alarm; wherein the controller is configured to activate the alarm in response to an abnormal operation of the fuel delivery system. In one example, the at least one record comprises one or more images of the fuel delivery system. In another example, the at least one record includes an installation record. In a variation thereof, the installation record includes an image of a first portion of the fuel delivery system, the first portion of the fuel delivery system being identified by the controller as related to the alarm. In another variation thereof, the at least one record further includes a maintenance record. In yet another variation thereof, the maintenance record includes an image of a first portion of the fuel delivery system, the first portion of the fuel delivery system being identified by the controller as related to the alarm.

Referring initially to FIG. 1, an exemplary fuel delivery system 10 is shown. Fuel delivery system 10 includes a fuel dispenser 12 having a hose 32 and a nozzle 34 for dispensing a liquid product, illustratively fuel 30, from a storage tank 26. Storage tank 26 is illustratively positioned underground but may alternatively be positioned above ground. A pump 28 is provided in storage tank 26 to pump fuel 30 through fuel line 38 and out nozzle 34 of fuel dispenser 12 upon request. Fuel line 38 is illustratively an underground pipeline, although other suitable fuel lines may be used.

A switch 36 closes when fuel dispenser 12 requests fuel 30 from storage tank 26. In one embodiment, the removal of nozzle 34 from fuel dispenser 12 closes switch 36. In one embodiment, switch 36 is closed in response to the actuation of a trigger, such as a handle or a lever, on nozzle 34. Closing switch 36 provides power to a pump relay 16 from a power source 14 to turn on pump 28. In one embodiment, power source 14 provides 115 Volts Alternating Current (VAC) to activate pump relay 16. With switch 36 closed, pump 28 displaces fuel 30 from storage tank 26 to fuel dispenser 12 and out nozzle 34. When fueling is complete, switch 36 is opened by returning nozzle 34 to fuel dispenser 12, releasing the trigger on nozzle 34, or by any other suitable input at fuel dispenser 12 that opens switch 36.

A pressure transducer 24 is coupled to fuel line 38 to detect the pressure level in fuel line 38. Pressure transducer 24 may be positioned in any suitable location along fuel line 38 to facilitate pressure detection within fuel line 38. A controller 18 monitors the output of pressure transducer 24 to detect the pressure level in fuel line 38. Controller 18 may determine the presence of a leak in fuel line 38 based on the monitored pressure level in fuel line 38. In the illustrated embodiment, the output of pressure transducer 24 is proportional to the pressure contained in fuel line 38. In one embodiment, pressure transducer 24 provides an analog voltage or current signal to controller 18 that is proportional to the pressure level in fuel line 38.

In one embodiment, controller 18 is an electronic controller and includes a microprocessor 20 having an associated memory 22. Memory 22 is configured to store data from fuel delivery system 10. Exemplary data stored in memory 22 includes the results of leak tests performed by controller 18 on fuel line 38 and/or on storage tank 26. Memory 22 includes leak detection software containing instructions that cause microprocessor 20 to perform a variety of functions, including performing leak tests on fuel delivery system 10, collecting and analyzing data obtained from the tests, and determining a leak test conclusion based on the analyzed data. Exemplary leak tests that may be performed by controller 18 are disclosed in U.S. patent application Ser. No. 14/088,378, filed Nov. 23, 2013, titled METHOD FOR DETECTING A LEAK IN A FUEL DELIVERY SYSTEM, the entire disclosure of which is expressly incorporated by reference herein. Further exemplary leak tests are disclosed in U.S. patent application Ser. No. 13/862,683, filed Apr. 15, 2013, titled METHOD AND APPARATUS FOR CONTINUOUSLY MONITORING INTERSTITIAL REGIONS IN GASOLINE STORAGE FACILITIES AND PIPELINES, the entire disclosure of which is expressly incorporated by reference herein An exemplary controller is the TS-550 evo brand Fuel Management System available from Franklin Fueling Systems located at 3760 Marsh Road in Madison, Wis.

Figure 2:
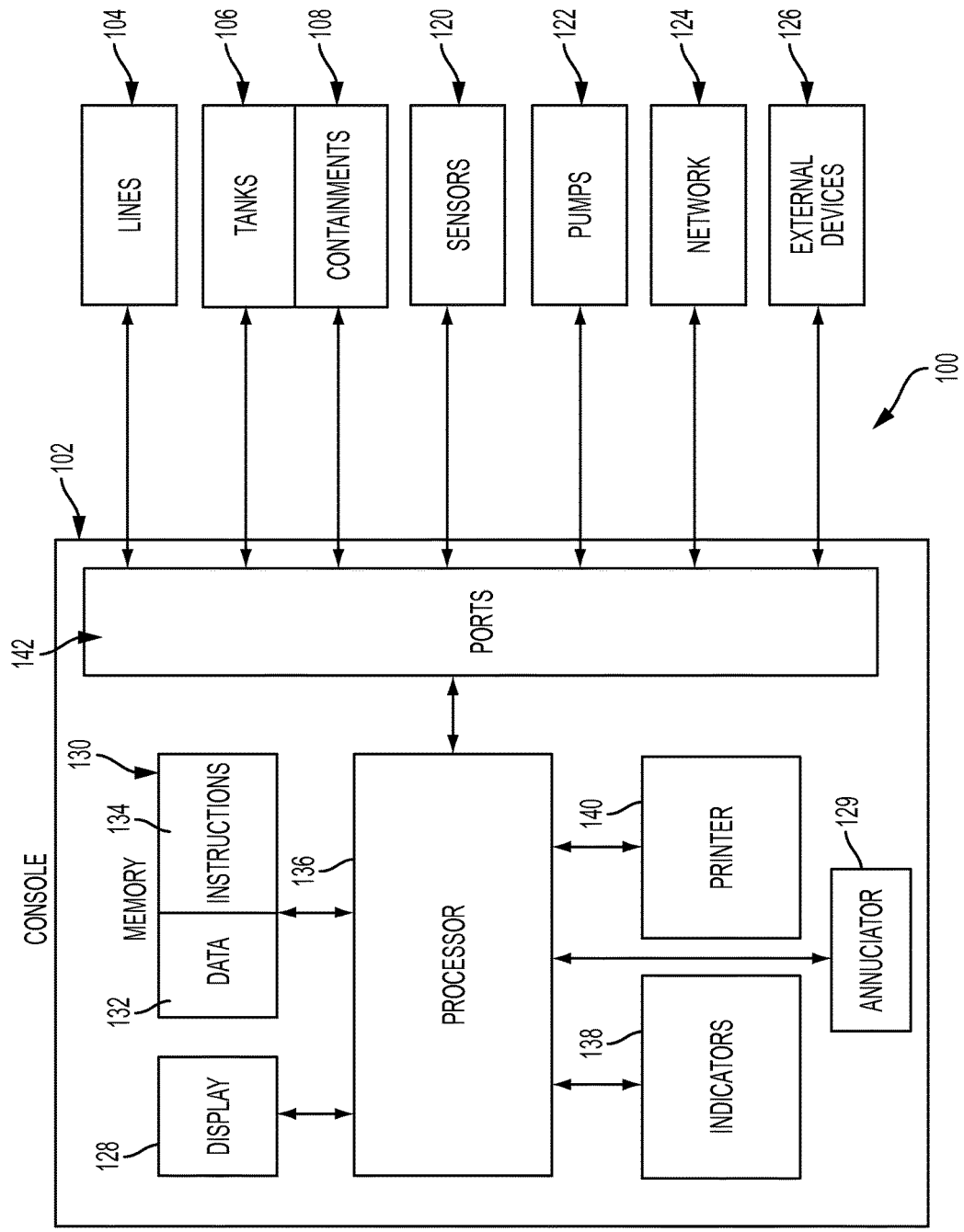
FIG. 2 illustrates an exemplary fuel delivery management system including a console.

Referring now to FIG. 2, a fuel delivery management system 100 is depicted including a system controller or console 102 in communication with a plurality of lines 104, a plurality of tanks 106, a plurality of containment systems 108, a plurality of sensors 120, a plurality of pumps 122, one or more networks 124, and one or more external devices 126, all of which are described in detail below. In one embodiment, console 102 generally includes a display 128, a memory 130 including data 132 and instructions 134, a processor 136, one or more indicators 138, an internal printer 140, and a plurality of communication ports 142.

Figure 3:
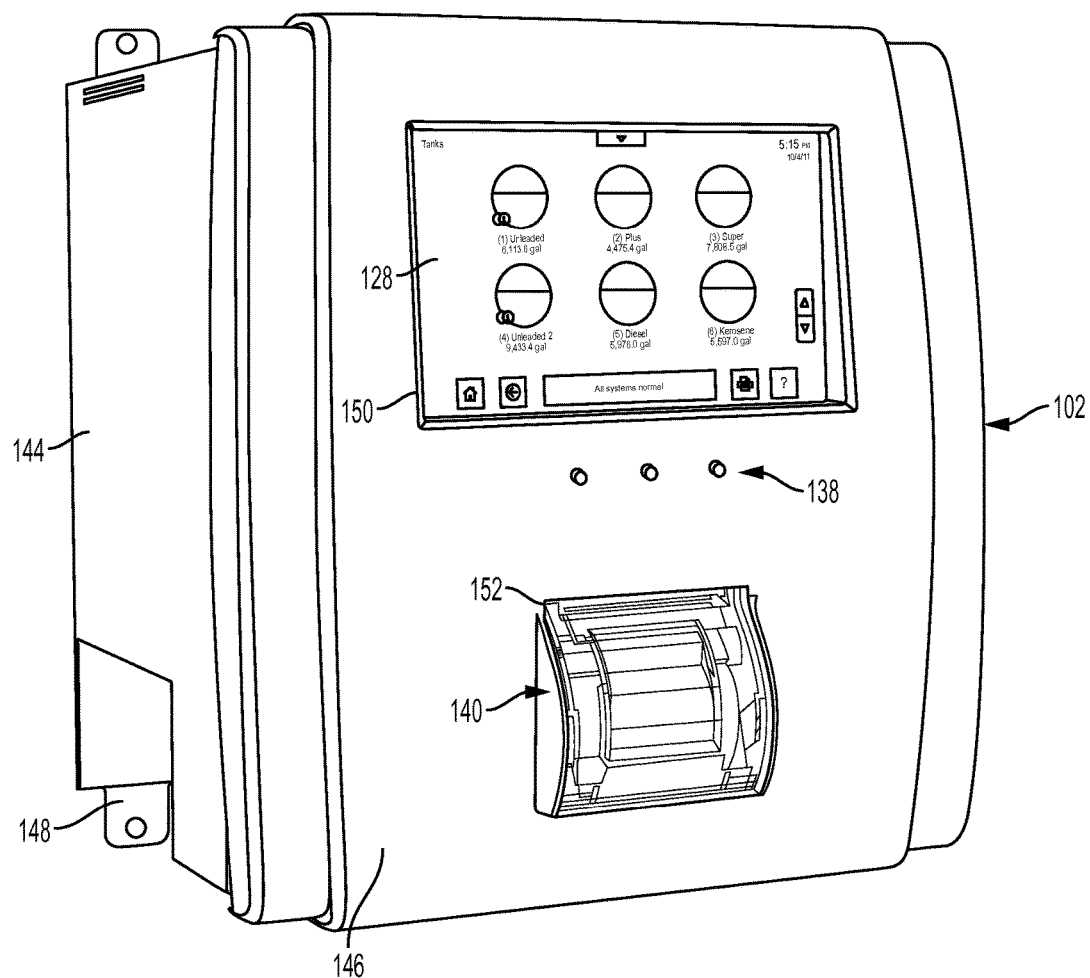
FIG. 3 is an isometric view of an exemplary embodiment of the console of FIG. 2.

Console 102, in one embodiment, is an open architecture, modular computing device with a highly evolved graphic user interface which enables users to monitor and control a plurality of components of fuel delivery management system 100. As best shown in FIG. 3, console 102 is configured with a housing 144 having a front panel 146 and mounting brackets 148. Display 128 is mounted to be accessible through an opening 150 in front panel 146. Similarly, printer 140 is mounted within housing 144 to be accessible through an opening 152 in front panel 66. Indicators 138 are likewise mounted to front panel 146 to be viewed by a user. In a typical installation, console 102 is mounted to a wall inside an area of a fuel operator building of a fuel dispensing facility that is accessible only by employees or authorized personnel.

In one embodiment, display 128 is a color LCD touch screen display which functions both as an output display device and an input device. Display 128 provides a plurality of different information and control screens (described in detail below) which may be navigated by a user through contact with various buttons and/or icons displayed on the screens. The user is provided soft keyboards and/or keypads where appropriate to enter textual and numeric information into console 102.

Memory 130 may include any of a variety of memory devices suitable for storing data 132 and instructions 134. As is further described below, data 132 includes a plurality of different variables and parameters relating to components of system 100 as well as historical performance information that may be retrieved using the reporting functions of console 102 as is further described below. Instructions 134 include an operating system and a plurality of software modules which enable the functions described herein. As will be understood by those skilled in the art, instructions 134 may be configured in a variety of suitable programming languages and/or configurations.

Memory 130 includes computer readable media. Computer-readable media may be any available media that may be accessed by processor 136 of console 102 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by processor 136. All of the memories disclosed herein may be a single computer readable device or multiple computer readable devices.

While processor 136 is depicted in FIG. 2 as a single block, it should be understood that processor 136 includes a plurality of different electronic components configured in circuits to perform the various control and communication functions described below. Processor 136 includes at least one microcontroller which functions as a computing device that receives information and commands, processes such information and commands, and outputs information and commands to other components of system 100. In one embodiment, processor 136 represents a distributed processing system with multiple processing units linked together through a CAN Open back plane. Throughout this disclosure, console 102 is described as performing various functions. More particularly, these functions are primarily performed by processor 136 accessing instructions 134 and data 132 of memory 130, accessing various system components through ports 142 of console 102, and updating screens on display 128 and/or providing outputs through indicators 138, printer 140, or external devices 126.

Indicators 138 provide users with instant visual information about the general status of system 100. In one embodiment, indicators 138 include a green LED which indicates that console 102 is powered and in operation, a yellow LED which indicates that console 102 has detected a malfunction or a warning condition, and a red LED which indicates that console 102 has detected an alarm condition.

Communication ports 142 of console 102 may include one or more comm ports, a fax/modem port, a LON port, an Ethernet port, one or more USB ports, an RS/485/TPI port, a bus extension port, and an RS-422/232 port. Comm ports are suitable for communication with external devices 126 such as a Point of Sale ("POS") terminal, an external modem, or a local personal computer. A Fax/modem port may be an RJ-11 connector configured for connection to a telephone line. A LON port may be a 2-pin terminal block suitable for connection to an IFSF network. An Ethernet port may be an RJ-45 connector suitable for connection to network 124. USB ports may be type A connectors which may be used to connect to any of a variety of USB compatible external devices 126 such as an external printer at the fuel sale location. A RS-485/TPI port may be a 4-pin terminal block suitable for connection to an external TS-DIM and intelligent pump controllers. A Bus extension port may be a 3-pin terminal block suitable for connection to an EVO-EXPC or EVO-EXPC2. A RS-422/232 port may be a DB9 male connector suitable for connection to a dispenser distribution box.

Referring back to FIG. 2, lines 104 are fluid conduits for moving fuel from a submersible pump 28 to a fuel dispenser 12. Each of lines 104 may include a transducer 24 (FIG. 1) which permits console 102 to monitor pressure in the line 104 and perform leak tests on the line 104.

Tanks 106 of FIG. 2 are typically submersible fuel containers positioned below the surface of a fueling area at a fuel sale location. Tanks 106 may include a plurality of inventory control probes which detect the levels of fuel in tanks 106, float kits, overfill prevention valves, drop tubes, submersible turbine pumps, and tank bottom protectors.

Containments 108 of FIG. 2 refer to tanks 106, lines 104 and containment sumps which have double walls enclosing an air or liquid filled volume surrounding the inner wall. For air filled containments 108, a transducer is included to permit console 102 to monitor a vacuum applied to the containment 108 to detect leaks.

Sensors 120 of FIG. 2 are liquid and/or hydrocarbon detection devices located in areas where liquid could collect in the event of a leak (e.g., outside tanks 106, in various sumps, containments 108, etc.). Sensors 120 generally detect the presence of such fluids and/or hydrocarbons and provide signals to console 102.

Pumps 122 of FIG. 2 represent intelligent pump controllers which interface with console 102, control operation of the submersible pumps 28, and detect error conditions associated with the pumps 28. Typically, one intelligent pump controller interfaces with one submersible pump 28 (FIG. 1). Console 102 interfaces with pumps 122, which may be submersible pumps 28, to activate or deactivate the corresponding submersible pump, and can reset pumps 122 in the event of an alarm condition.

Network 124 of FIG. 2 represents a connection to a LAN or WAN. The terms "network," "local area network," "LAN," "wide area network," or "WAN" mean a connection infrastructure wherein two or more computing devices are connected in such a manner that messages may be transmitted between the devices. In such networks, typically one or more computing devices operate as a "server," a computer with large storage devices such as hard disk drives and communication hardware to operate peripheral devices such as printers or modems. Other devices, termed "workstations," provide a user interface so that users of networks can access the network resources, such as shared data files, common peripheral devices, and inter-workstation communication. The computing devices typically have at least one processor for executing machine instructions, and memory for storing instructions and other information. Many combinations of processing circuitry and information storing equipment are known by those of ordinary skill in these arts. A processor may be a microprocessor, a digital signal processor ("DSP"), a central processing unit ("CPU"), or other circuit or equivalent capable of interpreting instructions or performing logical actions on information. Memory includes both volatile and non-volatile memory, including temporary and cache, in electronic, magnetic, optical, printed, or other format used to store information.

External devices 126 of FIG. 2 may include an external printer, modem, expansion console, point of sale device, or other accessory that is accessible via one of ports 142.

Further details of console 102 and fuel delivery management system 100 are disclosed in U.S. patent application Ser. No. 13/630,126, filed Sep. 28, 2012, titled FUEL DELIVERY MANAGEMENT SYSTEM, the entire disclosure of which is expressly incorporated by reference herein.

Figure 4:
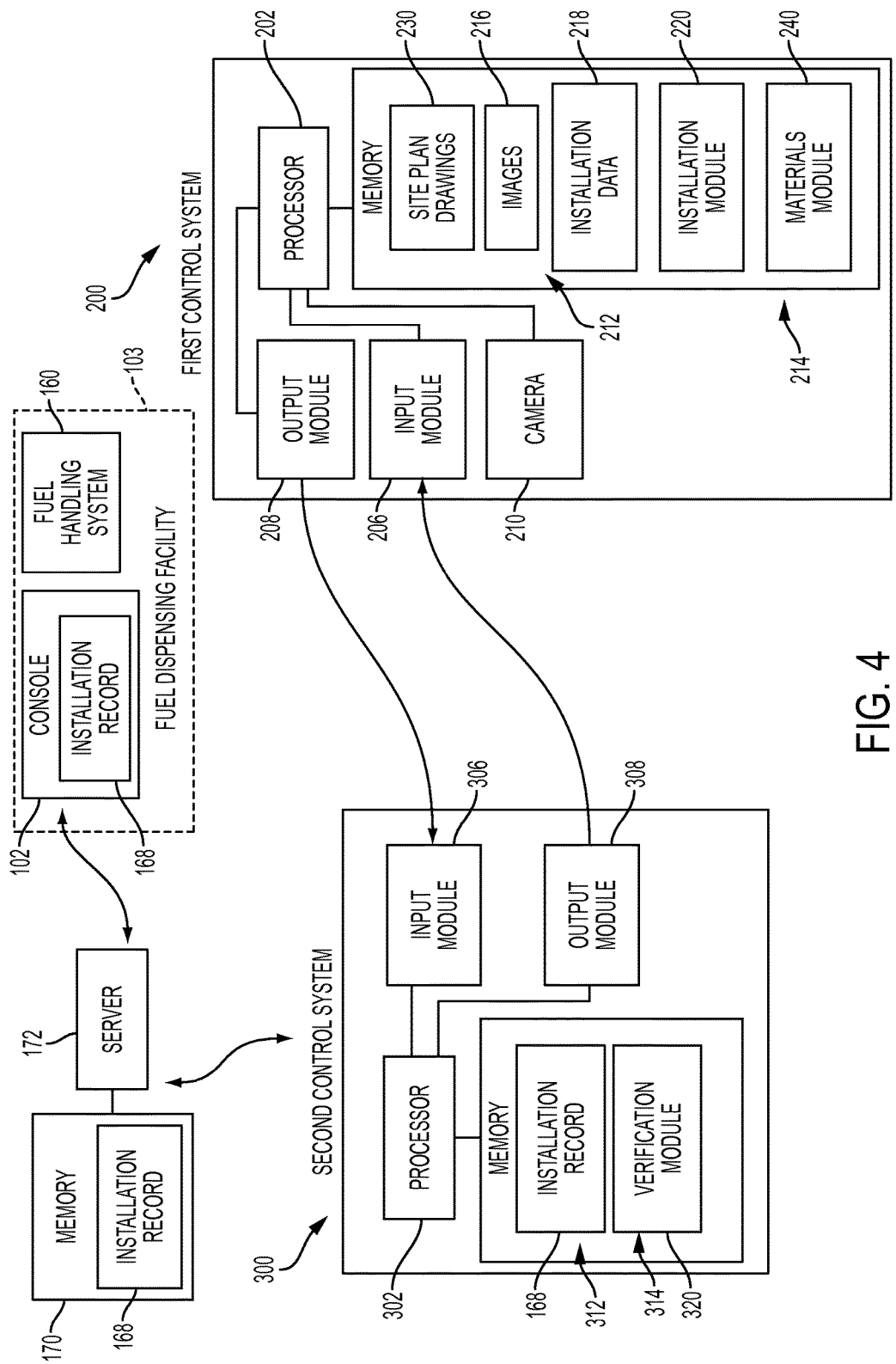
FIG. 4 illustrates an exemplary system for installation of a fuel delivery system of a fuel dispensing facility.

Referring to FIG. 4, console 102 is part of a fuel dispensing facility 103. The fuel dispensing facility 103 includes the station house where an operator of the fuel dispensing facility 103 is stationed, tanks 106, containment systems 108, lines 104, sensors 120, and pumps 122. Each of tanks 106, containment systems 108, lines 104, sensors 120, and pumps 122 are exemplary systems of fuel dispensing facility 103 and one of tanks 106, containment systems 108, lines 104, sensors 120, and pumps 122 is represented in FIG. 4 as fuel handling system 160. In one embodiment, console 102 may be considered a fuel handling system 160.

In one embodiment, console 102 includes or has access to installation records for fuel handling system 160 which provide information regarding the installation of fuel handling system 160 into the fuel delivery management system 100 of fuel dispensing facility 103. Since there are many components which form fuel delivery management system 100, in one embodiment, console 102 includes or has access to installation records for multiple systems. Exemplary installation records may include an identification of the installer, images of the installation or completed installation, videos of the installation or completed installation, and other data which provides an indication of the placement or assembly of components of the system.

In one embodiment, console 102 stores the installation records 168 for fuel dispensing facility 103 in memory 130. In one embodiment, console 102 retrieves the installation records 168 for fuel dispensing facility 103 from a remote memory 170 which is accessible over networks 124 (FIG. 2) through a server 172. In one exemplary embodiment, one or more sensors 120 (FIG. 2) are accessible over networks 124 through a server 172. In a more particular embodiment, the sensors 120 are individually addressed to communicate with a controller, such as controller 18 or console 102, over a network. In one example, server 172 is a cloud based server.

Figure 5:
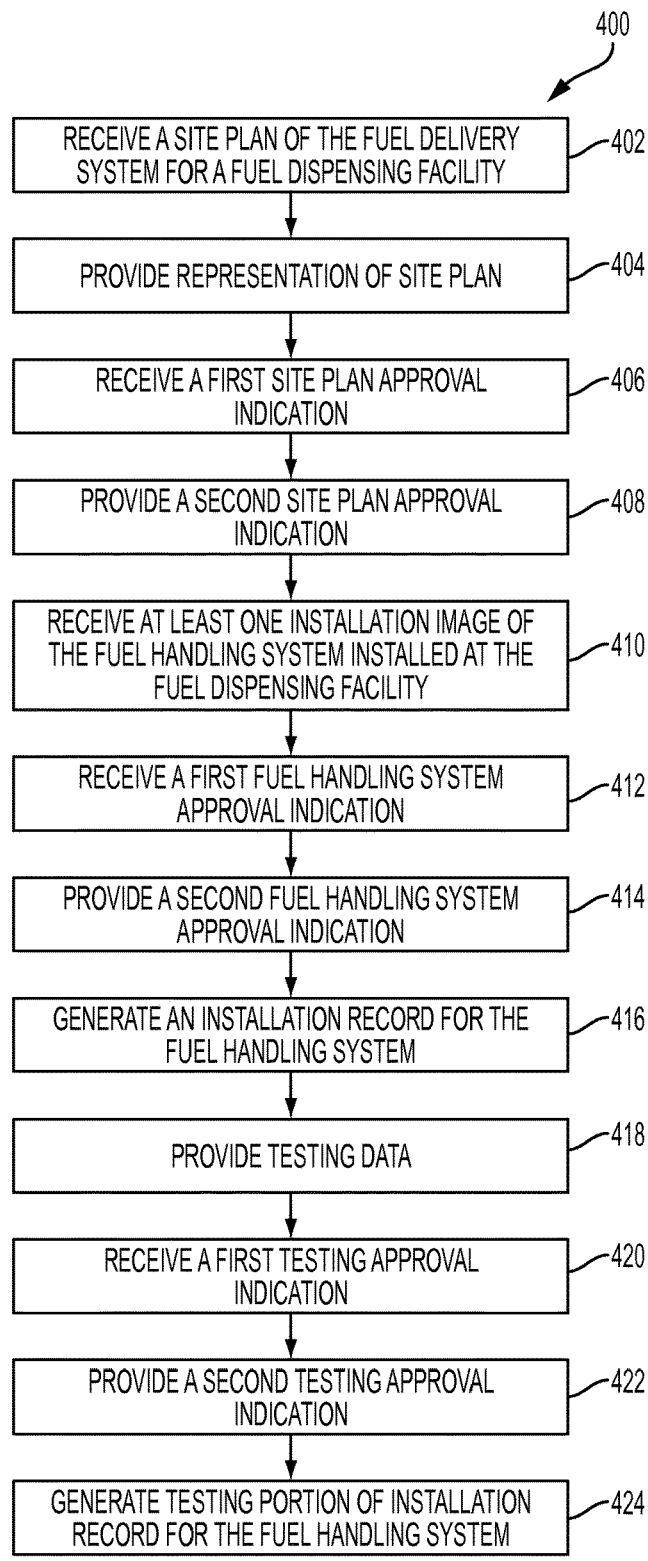
FIG. 5 illustrates an exemplary processing sequence of the control system of FIG. 4.

Referring to FIGS. 4 and 5, an exemplary process for the generation of installation records 168 are described. Referring to FIG. 4, a first control system 200 is illustrated. First control system 200 may be a computer, a tablet, a phone, or other computing device. First control system 200 includes a processor 202, a memory 204, one or more input modules 206, and one or more output modules 208. Input modules 206 include any device and associated software which receives an input.

Exemplary input modules 206 include a touch screen, a keyboard, a mouse, and buttons or switches which receive an input from a human operator. These inputs may be used to cause processor 202 to undertake some action, such as storing data on memory 204. Further exemplary input modules 206 include a network interface device such as an Ethernet communication module, a wireless network communication module, a cellular telephone communication module. These inputs receive signals generated remotely from the first control system 200 which cause the processor 202 to undertake some action, such as storing data on memory 204. Further, exemplary input modules 206 include information capture devices such as still cameras, video cameras, microphones, and other suitable devices which capture information about fuel dispensing facility 103. These inputs receive data that causes processor 202 to undertake some action, such as storing the data on memory 204. As illustrated in FIG. 4, in one embodiment, first control system 200 includes a camera 210.

Exemplary output modules 208 include a touch screen, a speaker, a display, a printer, and other devices which present a human perceivable output to an operator. These outputs may be generated by processor 202. Further exemplary output modules 208 include a network interface device such as an Ethernet communication module, a wireless network communication module, a cellular telephone communication module. These outputs send signals generated by processor 202 remotely to other computing devices.

As indicated above, in some embodiments, the same component may function as both an input module 206 and an output module 208. One example is a touch screen. Another example is a communication module.

Memory 204 may include any of a variety of memory devices suitable for storing data 212 and instructions 214. As is further described below, data 212 includes a plurality of different variables and parameters relating to components of fuel dispensing facility 103 and fuel delivery management system 100, as well as, images 216 and installation data 218. Instructions 214 include an operating system and a plurality of software modules, such as installation module 220, which enable the functions described herein. As will be understood by those skilled in the art, instructions 214 may be configured in a variety of suitable programming languages and/or configurations.

Memory 204 includes computer readable media. Computer-readable media may be any available media that may be accessed by processor 202 of first control system 200 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by processor 202.

While processor 202 is depicted in FIG. 4 as a single block, it should be understood that processor 202 includes a plurality of different electronic components configured in circuits to perform the various control and communication functions described below. Processor 202 includes at least one microcontroller which functions as a computing device that receives information and commands, processes such information and commands, and outputs information and commands to other components of first control system 200.

In one embodiment, processor 202 represents a distributed processing system with multiple processing units linked together. Throughout this disclosure, first control system 200 is described as performing various functions. More particularly, these functions are primarily performed by processor 202 accessing instructions 214 and data 212 of memory 204, accessing or communicating with various input modules 206 and output modules 208.

Further, a second control system 300 is illustrated in FIG. 4. Second control system 300 may be a computer, a tablet, a phone, or other computing device. Second control system 300 includes a processor 302, a memory 304, one or more input modules 306, and one or more output modules 308. Input modules 306 include any device and associated software which receives an input.

Exemplary input modules 306 include a touch screen, a keyboard, a mouse, and buttons or switches which receive an input from a human operator. These inputs may be used to cause processor 302 to undertake some action, such as storing data on memory 304. Further exemplary input modules 306 include a network interface device such as an Ethernet communication module, a wireless network communication module, a cellular telephone communication module. These inputs receive signals generated remotely from the second control system 300 which cause the processor 302 to undertake some action, such as storing data on memory 304. Further exemplary input modules 306 include information capture devices such as still cameras, video cameras, microphones, thermal imagers, and other suitable devices which capture information. These inputs receive data that cause processor 302 to undertake some action, such as storing the data on memory 304.

Exemplary output modules 308 include a touch screen, a speaker, a display, a printer, and other devices which present a human perceivable output to an operator. These outputs may be generated by processor 302. Further exemplary output modules 308 include a network interface device such as an Ethernet communication module, a wireless network communication module, a cellular telephone communication module. These outputs send signals generated by processor 302 remotely to other computing devices.

As indicated above, in some embodiments, the same component may function as both an input module 306 and an output module 308. One example is a touch screen. Another example is a communication module.

Memory 304 may include any of a variety of memory devices suitable for storing data 312 and instructions 314. As is further described below, data 312 includes a plurality of different variables and parameters relating to components of fuel dispensing facility 103 and fuel delivery management system 100 as well as images 216 and installation data 218 received from fuel delivery management system 100. These images 216 and installation data 218 may be saved as one or more installation records 168. Instructions 314 include an operating system and a plurality of software modules, such as verification module 320, which enable the functions described herein. As will be understood by those skilled in the art, instructions 314 may be configured in a variety of suitable programming languages and/or configurations.

Memory 304 includes computer readable media. Computer-readable media may be any available media that may be accessed by processor 302 of second control system 300 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by processor 302.

While processor 302 is depicted in FIG. 4 as a single block, it should be understood that processor 302 includes a plurality of different electronic components configured in circuits to perform the various control and communication functions described below. Processor 302 includes at least one microcontroller which functions as a computing device that receives information and commands, processes such information and commands, and outputs information and commands to other components of second control system 300. In one embodiment, processor 302 represents a distributed processing system with multiple processing units linked together. Throughout this disclosure, second control system 300 is described as performing various functions. More particularly, these functions are primarily performed by processor 302 accessing instructions 314 and data 312 of memory 304, accessing or communicating with various input modules 306 and output modules 308.

Referring to FIG. 5, an exemplary process for verifying an installation of fuel delivery management system 100 (FIG. 2) at fuel dispensing facility 103 (FIG. 4) is illustrated. In the following illustration (and with reference to FIG. 4), first control system 200 is used by a project manager or other individual or entity responsible for a design and/or construction of fuel dispensing facility 103 and second control system 300 is used by a product manufacturer of fuel handling system 160, an insurer of the product manufacturer of fuel handling system 160, or other individual or entity responsible for the supply of the components of fuel handling system 160. Of course, multiple first control systems 200 and second control system 300 may be utilized.

With first control system 200, the project manager initiates a site construction job file through installation module 220 with the use of one or more input modules 206. The site construction job file may include various types of information. Exemplary information includes location of proposed fuel dispensing facility 103, proposed layout information for fuel dispensing facility 103, proposed system components for fuel dispensing facility 103, and other information. In one embodiment, the project manager uploads to first control system 200 or generates with first control system 200 one or more site plan drawings 230 which provide detailed information on the proposed layout of fuel delivery management system 100 for fuel dispensing facility 103. The site plan drawings 230 are loaded into installation module 220 and sent to or otherwise made available to second control system 300 with the use of one or more output modules 208. In another embodiment, the project manager provides the site plan drawings 230 to second control system 300 without the use of first control system 200.

Second control system 300 receives the site plan drawings 230, as represented by block 402 in FIG. 5. Second control system 300 through verification module 320 provides a representation of the proposed fuel dispensing facility 103 to an operator through one or more output modules 308, as represented by block 404. In one embodiment, verification module 320 performs an initial analysis on site plan drawings 230 to determine if site plan drawings 230 comply with stored guidelines. For example, verification module 320 may verify that all data fields are completed or that piping layout does not violate minimum bend radius constraints.

The operator will review the site plan drawings 230 through input modules 306 and output modules 308. If the site plan drawings 230 are approved, the operator will provide a first site plan approval indication, as represented by block 406. Exemplary approval indications include a selection of an approval input displayed on a display or other input received through one or more of input modules 306. Second control system 300 then provides a second site plan approval indication, as represented by block 408. Exemplary approval indicators include the transmission of a message from second control system 300 to first control system 200 through output modules 308 and input modules 206. In one example, a copy of the site plan drawings are returned with an assured quality logo or other indicator provided on the site plan drawings. If the site plan drawings 230 are not approved, the operator will communicate the deficiencies to the project manager. In one embodiment, this communication is made through second control system 300 and first control system 200.

Once the plans for installation of fuel handling system 160 have been approved, the project manager initiates an order for the required materials through materials module 240. In one embodiment, the materials order is sent with input modules 206 to second control system 300 to initiate an order of materials.

Once the materials are received at fuel dispensing facility 103, installation of various fuel handling systems 160 may begin. For each fuel handling system 160, the correct installation of the fuel handling system 160 is verified with first control system 200. Exemplary fuel handling system 160 include systems configured to one of (1) deliver the fuel to the at least one underground storage tank, (2) receive the fuel from the at least one underground storage tank, and (3) monitor for a leak within the fuel delivery system.

For each fuel handling system 160, the project manager inputs to first control system 200 through input modules 206 an identification of the certified contractor performing the installation. In one embodiment, the contractor may be required to swipe an identification card through one of input modules 206, enter a confidential pin with one of input modules 206, or otherwise directly provide identifying information. The project manager overseeing the installation then completes an installation checklist or forms presented by installation module 220 for the installation of fuel handling system 160. In one embodiment, the project manager captures one or more images 216 of fuel handling system 160 with camera 210 during installation and/or after installation of fuel handling system 160. The images 216 are sent to second control system 300 with output modules 208. Second control system 300 receives the images 216, as represented by block 410 in FIG. 5. In one example, additional installation information regarding fuel handling system 160 is sent to second control system 300.

Second control system 300 through verification module 320 provides a representation of images 216 of fuel handling system 160 to an operator through one or more output modules 308. The operator will review the images 216 through input modules 306 and output modules 308. If the images 216 are approved, the operator will provide a first fuel handling system approval indication, as represented by block 412. Exemplary approval indications include a selection of an approval input displayed on a display or other input received through one or more of input modules 306. Second control system 300 then provides a second fuel handling system approval indication, as represented by block 414. Exemplary approval indicators include the transmission of a message from second control system 300 to first control system 200 through output modules 308 and input modules 206. If the fuel handling system 160 is not approved, the operator will communicate the deficiencies to the project manager. In one embodiment, this communication is made through second control system 300 and first control system 200.

Once the plans for installation of fuel handling system 160 have been approved, instructions 314 generates installation records 168, as represented by block 416. In one embodiment, before the installation is approved, fuel handling system 160 must be tested. The project manager oversees testing of fuel handling system 160 and submits results to second control system 300 through installation module 220 of first control system 200, as represented by block 418. In one embodiment, the following forms indicating the completion and results of the following tests must be included in the submission to second control system 300: (1) Pipe tightness test; (2) Line leak detection test (MLD or ELD), (3) console 102 configuration file; (4) Tank tightness test; and (5) Dispenser Sump and Tank Chamber vacuum or hydrostatic testing.

Second control system 300 through verification module 320 provides a representation of the testing date of fuel handling system 160 to an operator through one or more output modules 308. The operator will review the testing through input modules 306 and output modules 308. If the testing data is approved, the operator will provide a first testing data approval indication, as represented by block 420. Exemplary approval indications include a selection of an approval input displayed on a display or other input received through one or more of input modules 306. Second control system 300 then provides a second fuel handling system approval indication, as represented by block 422. Exemplary approval indicators include the transmission of a message from second control system 300 to first control system 200 through output modules 308 and input modules 206. If the testing data of fuel handling system 160 is not approved, the operator will communicate the deficiencies to the project manager. In one embodiment, this communication is made through second control system 300 and first control system 200. If the testing data of fuel handling system 160 is approved, a testing data portion is added to installation records 168 for fuel handling system 160.

The completed installation records 168 are stored and are available for later retrieval by certified maintenance contractors. In one embodiment, the installation records 168 are stored on memory 130 of console 102 (FIG. 2).

Figure 6:
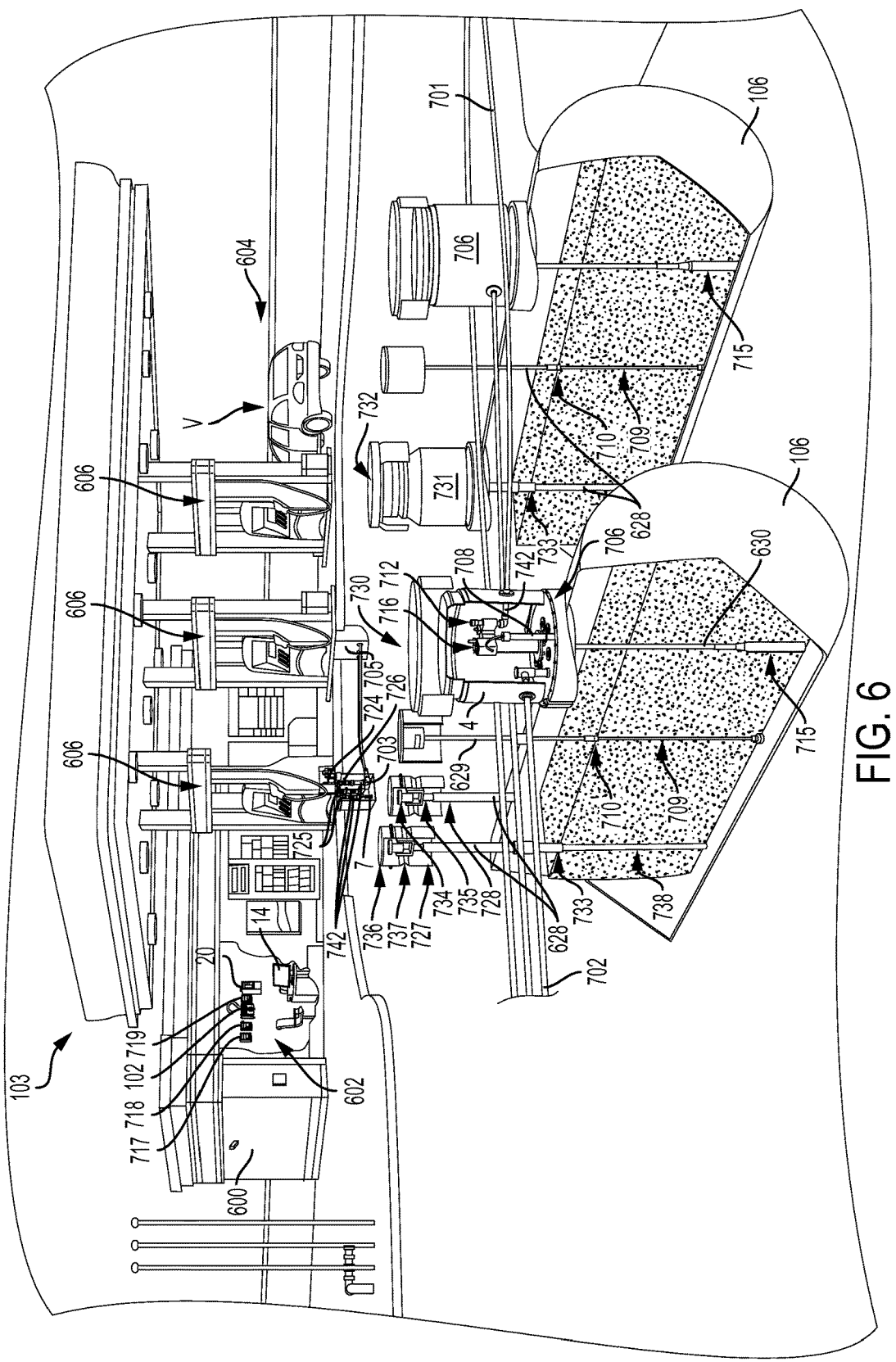
FIG. 6 illustrates an exemplary fuel dispensing facility having a plurality of fuel handling systems installed.

Referring now to FIG. 6, an exemplary fuel dispensing facility 103 is shown. Facility 103 includes service building 600 having control room 602 therein, and fuel station 604 having at least one (in the illustrated embodiment, three) fuel dispensers 606 adapted to transfer fuel from fuel storage tanks 106 to a purchaser's fuel tank, such as to the fuel tank of vehicle V. Although illustrated as underground fuel storage tanks 106 in the exemplary embodiment of FIG. 6, in other embodiments, fuel storage tanks 106 may be positioned above-ground. Fuel dispensing facility 103 is constructed and operated in cooperation with fuel delivery management system 100 and its associated control systems, as described in detail herein.

As described in further detail below, fuel dispensing facility 103 provides for deposit of fuel (e.g., from fuel trucks) to fuel storage tanks 106 via riser pipes 628, which extend between fuel storage tanks 106 and ground level, and are accessible by removal of fill cap 736. Spill container 727 may be disposed at the ground-level opening for riser pipes 628, in order to capture any spilled fuel around riser pipes 628 during filling of storage tank 106. As further described below, spilled fuel may be recovered within spill container 727 and delivered to tank 106, or may be withdrawn (e.g., by a vacuum) from spill container 727. The deposited fuel is withdrawn by submersible turbine pump (STP) 715, which pumps fuel from tanks 106 to fuel dispensers 606 on demand, via riser pipe 630, tank sump 706, and a network of flexible conduits 701 and associated fittings and connectors.

At every stage of the fuel deposit, storage and withdrawal process employed by fuel dispensing facility 103, the components of fuel handling system 160 are monitored for proper function and performance, as described in detail herein. In addition, parameters and metrics relating to the initial installation of the various components of fuel dispensing facility 103 and fuel handling system 160 (FIG. 4) are also specified by the present method and system. These parameters and metrics are input into fuel delivery management system 100, as also described below, to ensure that desired performance characteristics of system 100 are met upon installation and initial use of the systems. Certain parameters and metrics pertaining to fuel dispensing facility and fuel handling system may also establish a baseline against which measurements are compared during future system monitoring.

As illustrated in FIG. 6, the exemplary fuel dispensing facility 103 further includes swivel and in-line breakaways 721, inverted coaxial hoses 722, safety sever breakaways 741, manways 730, vapor recovery swivel adapter 735, extractor vents 740, drop tubes 738, and tank bottom protector 739.

Figure 7:
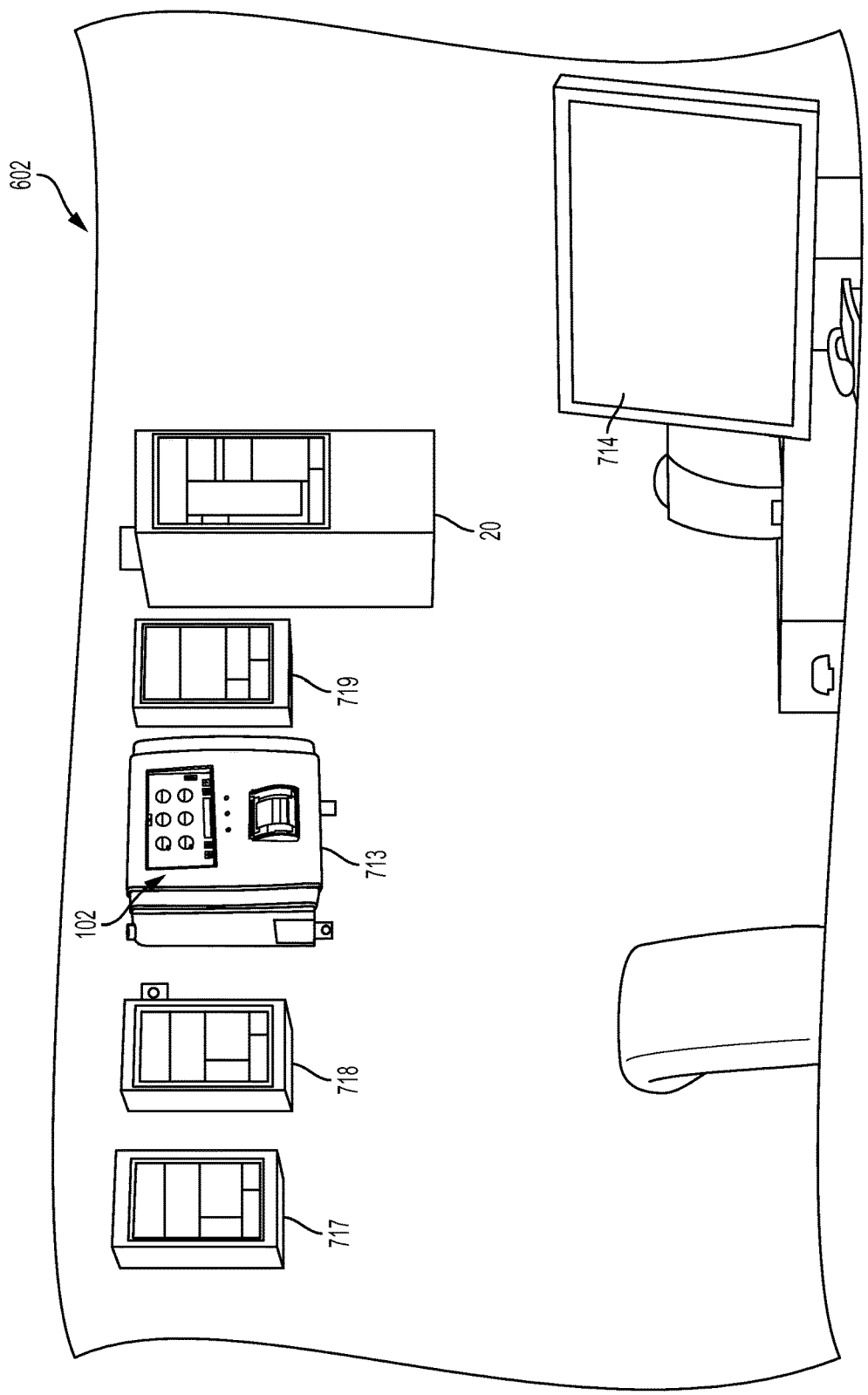
FIG. 7 is a perspective view of an exemplary control room of the fuel dispensing facility shown in FIG. 6, illustrating various controllers.

Turning now to FIG. 7, an exemplary control room 602 is illustrated. In the illustrated embodiment, control room 602 is a secure room within service building 600, such that it is accessible only to authorized personnel who are trained for proper use and monitoring of the components, control systems, and feedback mechanisms of fuel delivery management system 100. Control room 602 may include a combination of controllers depending on the arrangement of motors and monitoring systems in use at dispensing facility 103. In the illustrated embodiment, control room 602 includes isolation controller 717, two single phase controllers 718, 719, variable frequency controller 720, console 102, and an online computer terminal 714.

Dispenser isolation controller 717 controls electrical power to each of the individual fuel dispensers 606 at fuel station 604 (FIG. 6). In particular, the electrical power to any individual fuel dispenser 606 can be shut off via controller 717, in order to facilitate safe maintenance and inspection of any dispenser 606 while allowing the other fuel dispensers 606 to remain operational. Single phase controllers 718, 719 are used to control single phase pumps, such as STPs 715. In addition, variable frequency controller 720 may be provided to control variable-speed STPs 715. Thus, STPs 715 may be provided as variable speed submersible pumps, fixed speed submersible pumps of an appropriate power (e.g., such as ¾ horsepower, ⅓ horsepower, 1½ horsepower, or 2 horsepower), or any combination thereof, as required or desired for particular applications. In high capacity pumping applications (e.g., high-flow pumps used for large vehicles), STPs 715 may be provided in high-power configurations such as 3 horsepower or 5 horsepower. Depending on the various STPs 715 used among the individual fuel storage tanks 106, any combination or quantity of pump controllers 718, 719 and/or 720 may be provided.

Console 102 and its interface with the various systems of fuel delivery management system 100 is described in detail above. In addition, online computer terminal 714 may be provided to operate as a "server" and may include peripheral devices such as printers or modems, as also described in detail above. In an exemplary embodiment, online computer terminal 714 is configured as a work station connected to the internet and/or other data networks.

Turning now to FIG. 8, an enlarged view of tank sump 706 used in fuel dispensing facility 103 is illustrated. As noted above, tank sump 706 is provided for each fuel storage tank 106, and serves as an interface for the withdrawal of fuel from tank 106 by STP 715, prior to delivery of fuel to fuel dispenser 606 via flexible conduit 701. When a signal for fuel delivery is received, such as by activation of nozzle 723 (FIG. 6), STP 715 pumps pressurized fuel to riser pipe 630, which is delivered to flexible conduit 701 via mechanical leak detector 716 and electronic line leak detector 712 disposed in tank sump 706. Leak detectors 712, 716 are adapted to sense leaks within flexible conduit 701, and, if a leak is detected, automatically restrict the flow of fuel from sump 706 to conduit 701. Exemplary leak detectors are available from Franklin Fueling Systems of Madison, Wis., USA. An exemplary leak detection system is disclosed in U.S. Pat. No. 8,418,531, the entire disclosure of which is expressly incorporated by reference herein.

Tank sump 706 further includes vapor recovery fitting 632 which is in fluid communication with the ullage of tank 106. Vapor recovered at nozzles 723 is delivered back to the ullage of tank 106 via semi-rigid weld pipe 702 and recovery fitting 632. In the illustrated embodiment, entry boot 704 is used to connect weld pipe 702 and recovery fitting 632 at the wall of tank sump 706, as further described below. At fuel dispenser 606, weld pipe 702 connects to vacuum pump 724 (FIG. 9) to drive the fuel vapor recovery operation, as also further described below. Tank sump sensor 708 is also received within tank sump 706, and is adapted to detect the presence and/or amount of water and/or fuel within an interior of sump 706. As described herein with respect to sensors 120, tank sump sensor 708 may interface with console 102 as part of fuel delivery management system 100 (FIG. 2).

Figure 10:
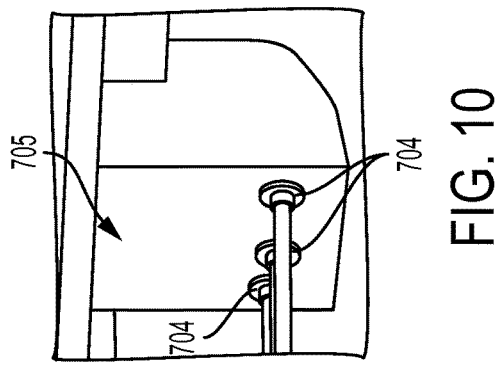
FIG. 10 is a perspective view of the dispenser sump shown in FIG. 9.
Figure 9:
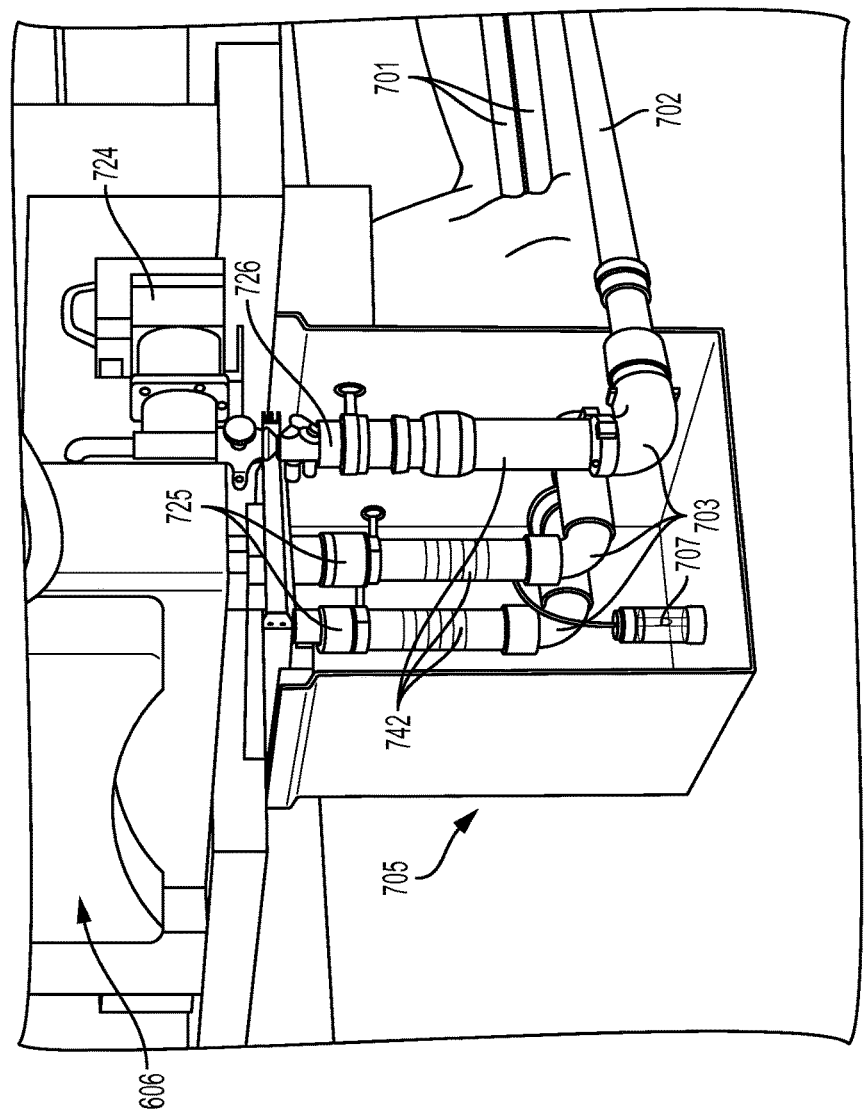
FIG. 9 is a perspective, partial section view of a dispenser sump of the fuel dispensing facility shown in FIG. 6, shown mounted beneath a fuel dispenser.

Turning now to FIG. 9, dispenser sump 705 is illustrated in its installed position underneath fuel dispenser 606 and below ground level. Dispenser sump 705 serves as a monitored junction between flexible conduits 701 for incoming fuel and weld pipe 702 for outgoing fuel vapor. In particular, flexible conduits 701 pass into dispenser sump 705 via entry boots 704 (FIG. 10), where they are fluidly connected to pipe fittings 703. Fittings 703 convey fuel from conduits 701 to fuel nozzles 723 (FIG. 6) of fuel dispenser 606, which in turn can be used to pump fuel to a point-of-use container such as vehicle V. In an exemplary embodiment and as noted above, fuel dispensers 606 are equipped with vapor recovery technology, in which fuel vapor released during fuel dispensing are recovered at the point of nozzle 723 and returned to the ullage space of fuel storage tanks 106. An exemplary nozzle 723 including vapor recovery functionality is disclosed in U.S. Pat. No. 8,752,597 entitled "Fuel Dispensing Nozzle," the entire disclosure of which is hereby explicitly incorporated by reference herein. In the illustrated embodiment of FIG. 9, fuel dispenser 606 includes vacuum pump 724 to create a vacuum at nozzle 723 to recover vapors released during fueling. Pump 724 delivers these recovered vapors to weld pipe 702 for conveyance to storage tank 106 via tank sump 706 and vapor recovery fitting 632 (FIG. 8).

Dispenser sump 705 includes fuel emergency shear valves 725 and vapor emergency shear valve 726 connected to fuel connectors 742 and pipe fitting 703, respectively. Shear valves 725, 726 are designed to automatically close if fuel dispenser 606 is laterally shifted, such as by impact with a vehicle. Shear valves 725, 726 prevent the flow of fuel and fuel vapor, respectively, from fuel storage tank 106 in the event of damage to fuel dispenser 606.

Dispenser sump sensor 707 is contained within dispenser sump 705, and monitors the interior space within dispenser sump 705 for the presence and/or amount of water and/or fuel contamination. If water or fuel is detected within dispenser sump 705, sensor 707 sends a signal to console 102. As described herein with respect to sensors 120, dispenser sump sensor 707 may interface with console 102 as part of fuel delivery management system 100 (FIG. 2).

Figure 11:
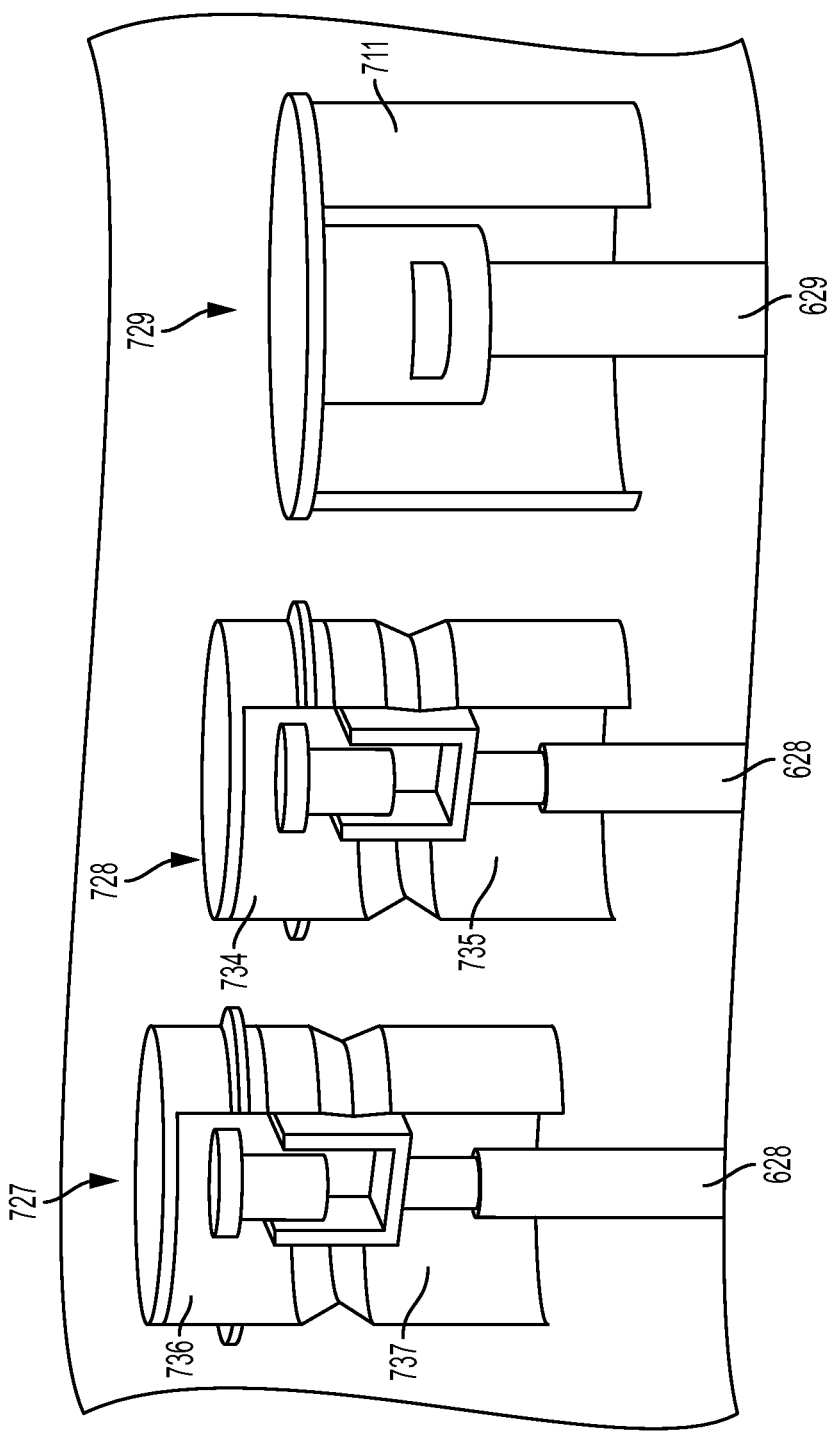
FIG. 11 is a perspective, partial section view of spill containment systems and a monitoring well in communication with the interior of an underground fuel storage tank of the fuel dispensing facility shown in FIG. 6.

Turning now to FIG. 11, spill containers 727 and 728 and probe well 711 are shown in detail. As noted above, spill container 727 is fluidly connected to riser pipe 628 and is used for depositing fuel into fuel storage tank 106, e.g., from a fuel truck. Spill container 727 connects to riser pipe 628 via swivel adapter 735, and includes an internal cavity to contain any fuel spills which may occur during such fuel deposits. Fill cap 736 seals the internal cavity of spill container 737 at the ground level to inhibit collection of rain water or debris within container 737 during normal operation of fuel dispensing facility, when access to riser pipe 628 is not needed. An exemplary spill container 727 is described in U.S. Pat. No. 8,684,024, entitled "Spill Containment Systems," the entire disclosure of which is hereby explicitly incorporated by referenced herein.

Turning again to FIG. 6, it can been seen that riser pipe 628 extending downwardly from spill container 727 reaches to near the bottom of fuel storage tank 106, and includes overfill prevention valve (OPV) 733 along its axial extent. In particular, OPV 733 is disposed along riser pipe 628 at the axial position corresponding to the desired maximum level of fuel in storage tank 106, and operates to prevent levels of fuel within fuel storage tank 106 from rising substantially above the level of overfill prevention valve 733. Further technical and operational detail of an exemplary OPV is described in U.S. Patent Application Publication No. 2014/0076421, filed Sep. 13, 2014 and entitled "Overfill Prevention Valve," and in U.S. patent application Ser. No. 14/588,710, filed Jan. 2, 2015 and entitled "Overfill Prevention Valve with Remote Testing" both commonly owned with the present application, the entire disclosures of which are hereby expressly incorporated herein by reference.

Spill container 728, best seen in FIG. 11, may be substantially identical to spill container 727 described in detail above. However, riser pipe 628, which is fluidly coupled to the interior cavity of spill container 728 via swivel adapter 735, extends downwardly only to the ullage space of fuel storage tank 106, rather than to near the bottom of tank 106 for riser pipe 628 underneath spill container 727. Riser pipe 628 and spill container 728 are used to vent the ullage space of tank 106 during the depositing of fuel. In an exemplary embodiment, fuel vapors may be recovered during this process to prevent the venting of the same to the open atmosphere. Spill container 728 may contain any condensed fuel which may precipitate from the fuel vapors, such that any such condensed fuel is not lost or leaked into the surrounding soil. In an exemplary embodiment, spill container 728 includes a drain to allow fuel collected at the bottom of spill container 728 to be returned directly to the interior of tank 106 via riser pipe 628. By contrast, spill container 727 may not include such a drain, such that any fuel contained at the bottom of spill container 727 must be vacuumed or otherwise withdrawn from above. As shown in FIG. 11, vapor recovery cap 734 may be provided to enclose the interior of spill container 728 at ground level between fuel deposits, similar to fill cap 736 described above. In one embodiment, spill container 728 includes a sensor that monitors for collected fluid.

Probe well 711 is also shown in FIG. 11, and is used for installation, access and monitoring of fuel probe 709. As illustrated, riser pipe 629 extends downwardly from well 711 into fuel storage tank 106, and provides a conduit through which tank monitoring probe 709 may be delivered to the interior of storage tank 106. Tank monitoring probe 709 may be used to monitor conditions inside tank 106, such as the amount of fuel contained therein, e.g., via float 710 which floats on the top surface of the fuel and sends a signal to console 102 indicating its axial position along probe 709. Probe 709 may also detect other conditions, including the presence of water, a phase-separated fluid, or other contaminants within tank 106. An exemplary embodiment of tank probe 709 is disclosed in U.S. Pat. No. 8,878,682 entitled "Method and Apparatus for Detection of Phase Separation in Storage Tanks," the entire disclosure of which is hereby incorporated herein by reference. Well 711 includes manhole 729 at the ground level similar to caps 734, 736 described above, and may be removed in order to allow access to tank probe 709 and riser pipe 629. In one embodiment, tank probe 709 provides an indication of the remaining fuel inventory in the associated fuel storage tank 106 to console 102.

Figure 12:
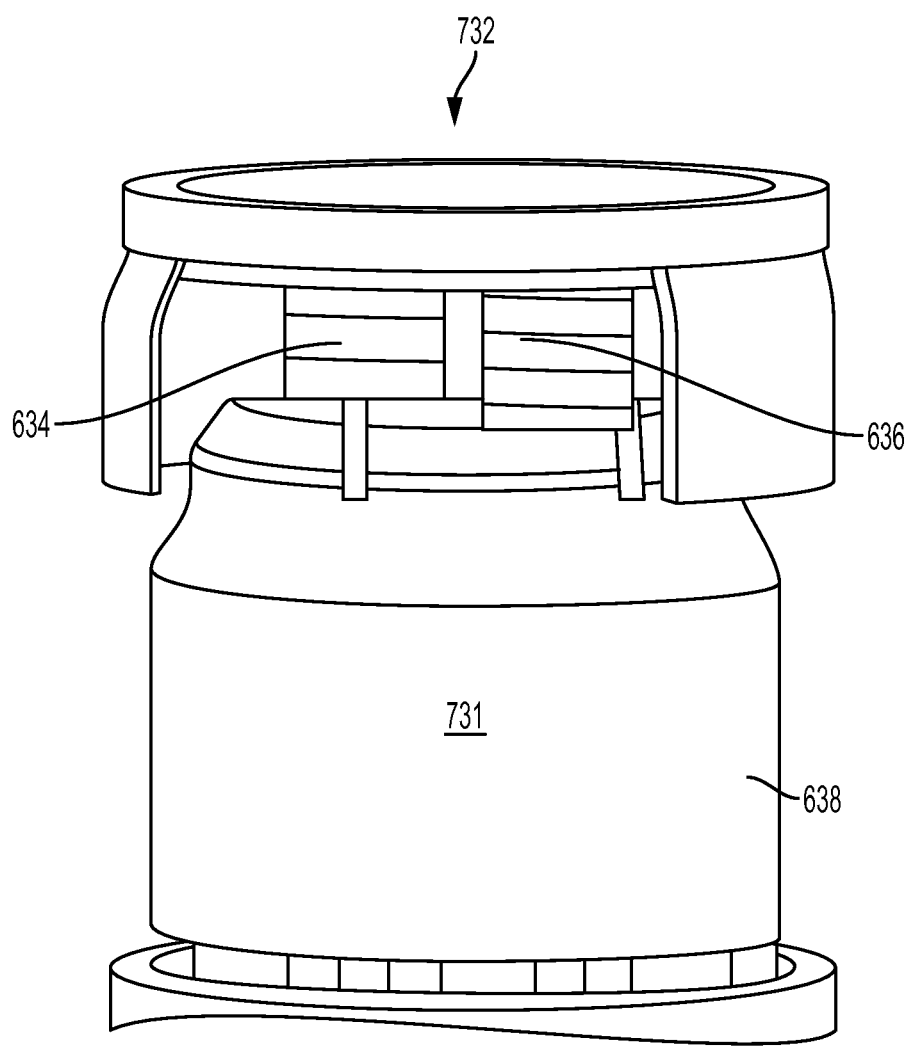
FIG. 12 is a perspective, partial cutaway view of a multi-port sump of the fuel dispensing facility of FIG. 6, shown mounted above an underground fuel storage tank.

Turning now to FIG. 12, multiport sump 731 is illustrated in detail. Multiport sump 731 is an alternative to the individual and separate spill containers 727, 728 described above, and may be used in a similar fashion in conjunction fuel storage tank 106. In particular, multiport sump 731 may include fuel port 634 and vent port 636, with a common spill container 638 positioned to contain any fluid spills from either of ports 634, 636. In an exemplary embodiment, spill container 638 may include some or all of the features and functions of the single-port spill containers 727, 728 described above. Manhole 732 encloses the upper portion of multiport sump 731 at ground level, similar to caps 734, 736 described above.

FIGS. 13-27 relate to exemplary installation and verification methods for various systems of fuel dispensing facility 103. As described in further detail below, in some exemplary embodiments, installation records 168 (FIG. 4) are generated by installers as fuel dispensing facility 103 is initially set up, such that second control system 300 (FIG. 4) takes account of the systems and techniques used during installation. Similarly, in some exemplary embodiments, data 212 used in control system 200 (FIG. 4) includes site plan drawings 230, images 216, and installation data 218 which are generated in whole or in part during the procedures depicted in FIGS. 13-27 and further described below. In some more particular embodiments, instructions 214 utilized by control system 200 may include data input via installation module 220 used by installers during installation of fuel handling systems 160 of fuel dispensing facility 103, as further described below.

Figure 13:
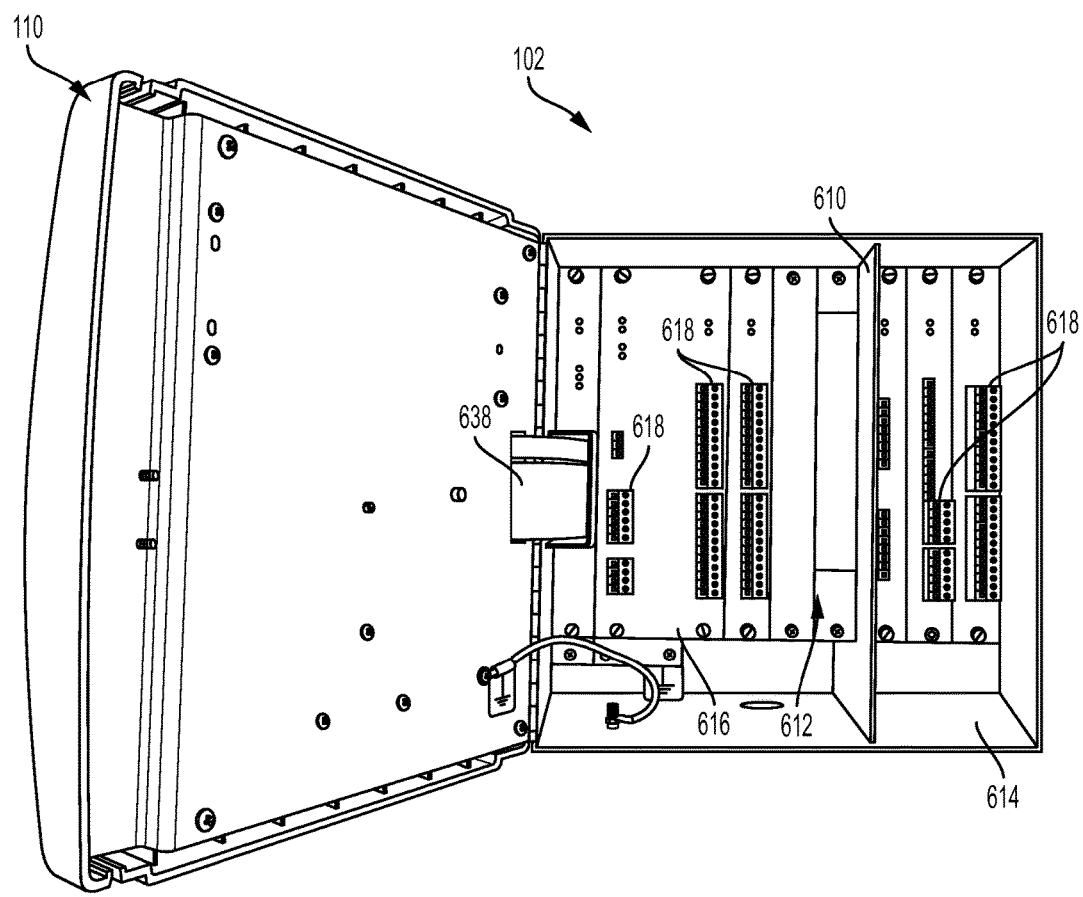
FIG. 13 is a perspective view of the control system console shown in FIG. 7, shown with a cover opened relative to a housing to illustrate control and power wire attachment points.

FIG. 13 is a perspective view of console 102, in which operator interface 110 thereof is pivoted to an open position to expose the interior area containing terminal blocks for receiving signal and power wires from the various components of fuel dispensing facility 103. As illustrated, console 102 includes an intrinsically safe (IS) barrier 610 which separates intrinsically safe (i.e., low current and low voltage) side 614 containing IS terminal blocks 618 from the higher current and/or higher voltage side 616 containing terminal blocks 618. In the illustrated embodiment, empty slots 612 are also included on the power side 616 of barrier 610. Low voltage wires, such as those used for sending and receiving control signals to and from the systems of fuel dispensing facility 103, are received within terminal blocks 618, and may be monitored and tested by an operator while avoiding any high voltage wires on the other side of barrier 610. Terminal blocks 618 receive higher voltage and power wires, such as those used to drive high power electrical equipment including STPs 15. Ribbon cable 637 is used to electrically connect terminal blocks 618 on both sides of barrier 610 to desired functionalities controllable by operator interface 110.

In one exemplary embodiment, installation forms are provided through installation module 220, and are completed upon installation of console 102. In one more particular embodiment, module 220 includes verification that all intrinsically safe wiring (e.g., low power and low voltage control system wires) enters console 102 on IS side 614, and that power wiring (e.g., higher voltage and/or higher current wiring) enters console 102 on power side 616. In a further exemplary embodiment, the installation forms verify that no terminal blocks 618 of IS side 614 are present on power side 616, and vice versa, and that no wires cross over IS barrier 610. In a still further exemplary embodiment, installation forms completed through installation module 220 include verification that barrier 610 is present, that empty slots 612 include a blank plate as illustrated, and that all wires are properly landed in one of terminal blocks 618. In one embodiment, an image of the completed wiring is sent to second control system 300 and maintained for later retrieval by console 102.

In one exemplary embodiment, further installation forms are completed through installation module pertaining to the initial tests of the overall fuel dispensing facility 103, including pressure and function tests pertaining to tanks 106 and configuration and setup of the various gauges and metrics provided by the monitoring systems of facility 103 and described herein. In some embodiments, these forms establish a baseline of system performance for comparison to later measurements.

Figure 14:
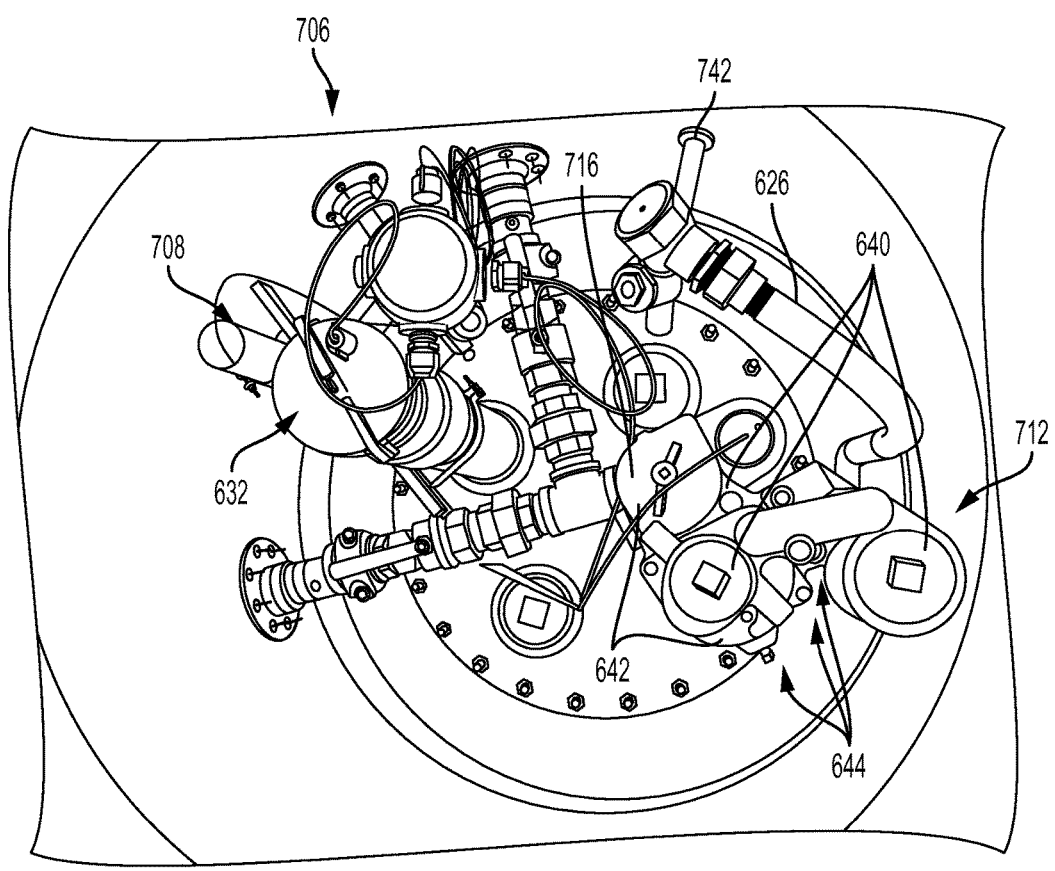
FIG. 14 is a plan, perspective view of the interior of a tank sump used in the fuel dispensing facility of FIG. 6.

Turning to FIG. 14, the interior of tank sump 706 is shown from above with certain components contained in sump 706. In one exemplary embodiment, after installation of STP 715 and the associated components and tank sump 706, various visual checks are performed and verified via installation module 220. As noted above, mechanical sump leak detector 716 and electronic line leak detector 712 are interposed between STP 715 (FIG. 6) and flexible conduit 701 (FIG. 8). In one exemplary embodiment, after installation of detectors 712, 716 in sump 706, visual confirmation is made that all leak detector caps 640 are properly installed and seated, that there are no visible signs of leaking from potential leak points 642 of leak detectors 712 and 716 respectively, and that all bolts and plugs 644 used in conjunction with detectors 712 and 716 are in place and properly seated. In an additional exemplary embodiment, a factory seal used in connection with leak detector caps 640 of electronic line leak detector 712 is verified as remaining in its factory-installed configuration and, if the factor seal is disrupted, an explanation is provided and recorded as to why leak detector caps 640 of detector 716 were opened. In an additional exemplary embodiment, verification that it was reinstalled properly is recorded.

Figure 15:
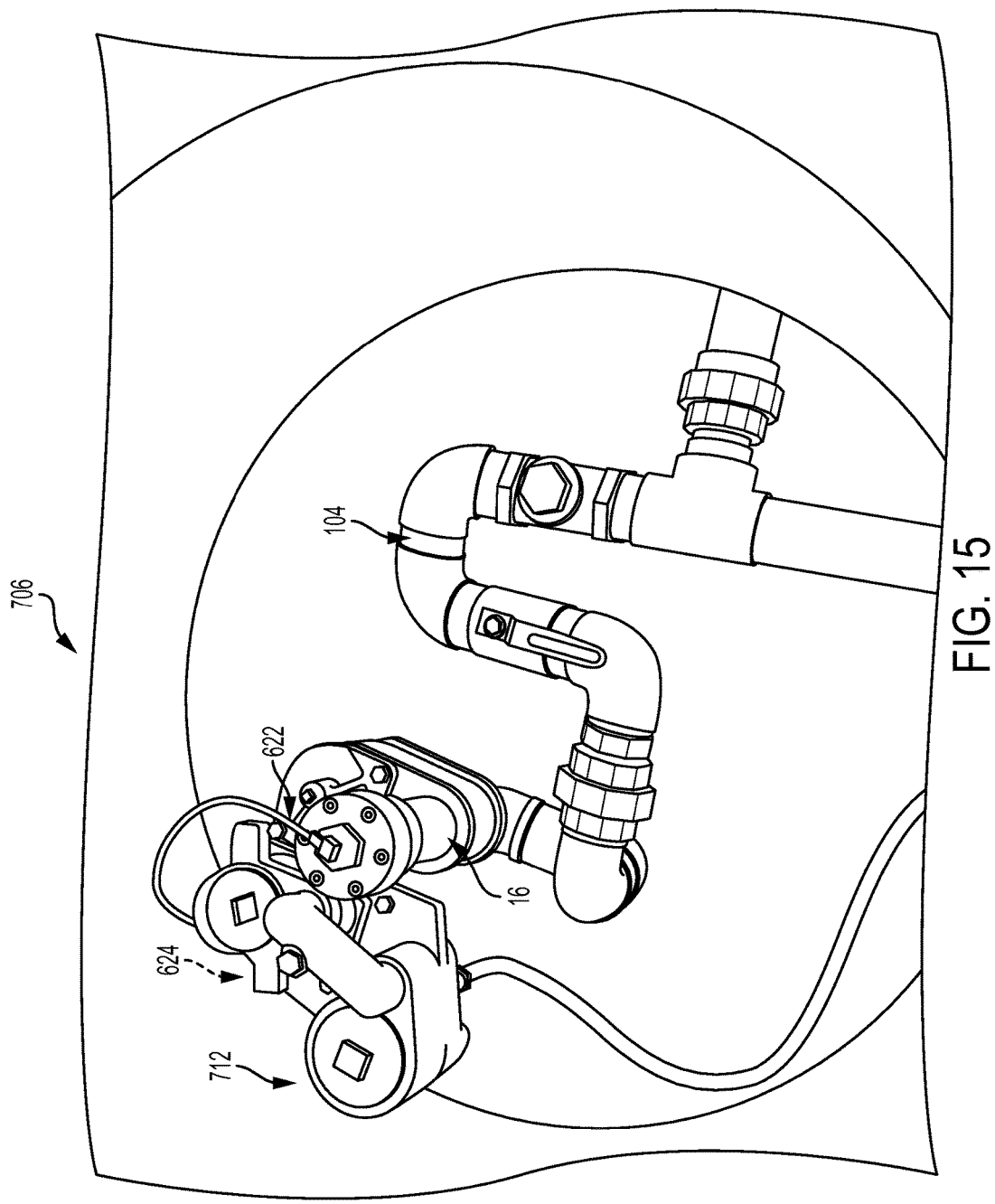
FIG. 15 is another plan, perspective view of the interior of a tank sump used in the fuel dispensing facility of FIG. 6.

FIG. 15 is another perspective view showing the interior of tank sump 706 from above. In particular, fuel lines 104 and detectors 712, 716 are illustrated independent of other components for clarity. In the illustrated embodiment, mechanical leak detector 716 includes vent tube 622 installed to a syphon port 624 (not shown) of STP 15 at one end and to a corresponding port in leak detector cap 640 of detector 716 at the opposite end. When properly installed, vent tube 622 slopes continuously downwardly to syphon port 624, and have no visible kinks or cracking along its axial extent. In one exemplary embodiment, after installation of detectors 712 and 716, an installation form is completed showing that testing was completed and passed, and demonstrating that no leak of 3 gallons per hour or greater occurs at a line pressure of 10 psi. In one exemplary embodiment, this installation form is completed through installation module 220.

FIGS. 16-21 provide illustrations of exemplary displays for various proper practices for installing flexible corrugated hose 626 between sections of rigid or semi-rigid fuel lines 104. In one embodiment, these displays are shown on a display of the first control system 200 during installation. In one embodiment, these displays are shown on a display of the first control system 300 during installation. Corrugated hose 626 is illustrated in FIG. 14 forming a proper connection between electronic line leak detector 712 and connector 742. In one exemplary embodiment, verification that all of the proper installation practices of FIGS. 16-21 is stored as installation records 168 on memory 130 of console 102 (FIG. 2). In one embodiment, images of the actual installation are stored as part of the verifications. In one exemplary embodiment, one or more of the illustrations provided in FIGS. 16-21 are provided on display 128 (FIG. 2).

Figure 16:
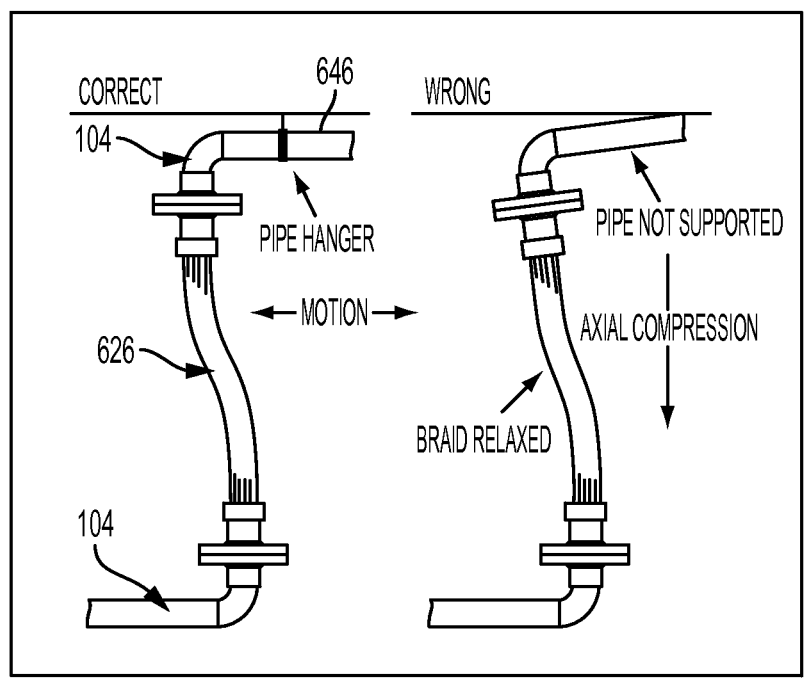
FIG. 16 is a schematic, elevation view of corrugated hose connecting fluid conduits in accordance with the present disclosure, as compared to a corrugated hose connection not in accordance with the present disclosure.

In FIG. 16, an exemplary "correct" image illustrates an upper fuel line 104 supported by pipe hanger 646, with a lower fuel line 104 disposed below the supported fuel line 104 as shown. Corrugated hose 626 illustratively connects the upper and lower fuel lines 104, with pipe hanger 646 preventing axial load or compression of hose 626 and thereby preventing relaxing of the braid in the jacket around hose 626. By contrast, an exemplary "wrong" orientation is shown in which the upper pipe is not supported, placing an axial load on the corrugated hose.

Figure 17:
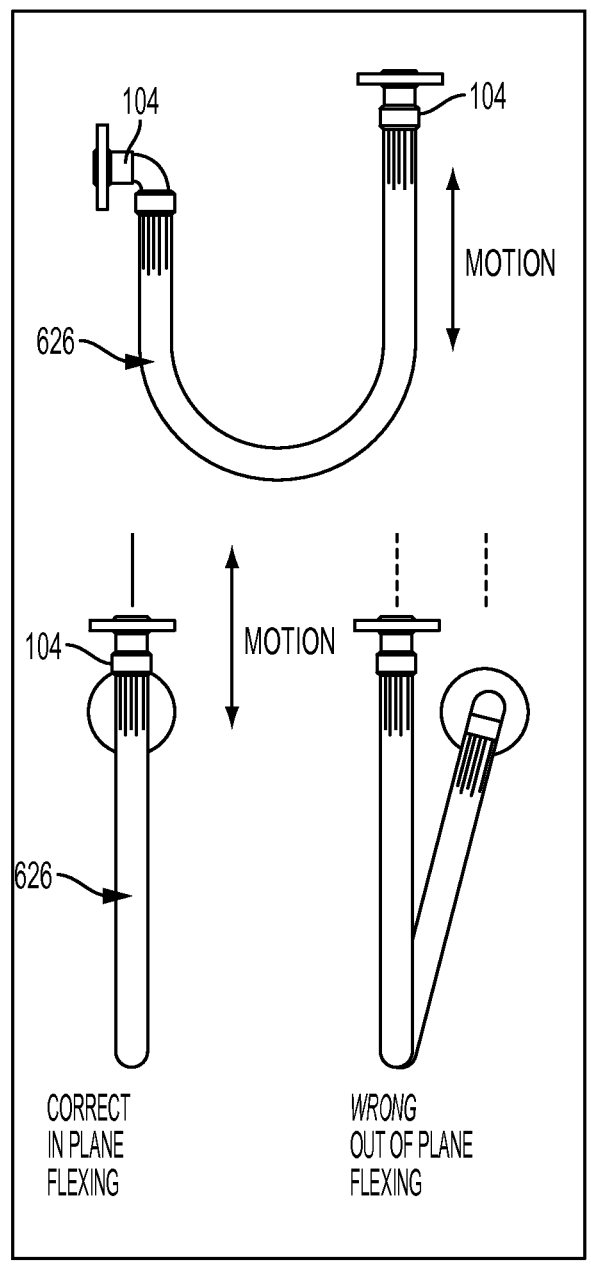
FIG. 17 is a schematic, elevation view of corrugated hose connecting fluid conduits in accordance with the present disclosure, as compared to a corrugated hose connection not in accordance with the present disclosure.

Turning to FIG. 17, a U-shaped flexible hose 626 is shown connecting to fuel lines 104, with an exemplary "correct" orientation maintaining hose 626 in a single plane, rather than out-of-plane as shown in the "wrong" orientation. In particular, the longitudinal axis formed by the "U" of the U-shaped flexible hose 626 illustratively lies in a single plane.

Figure 18:
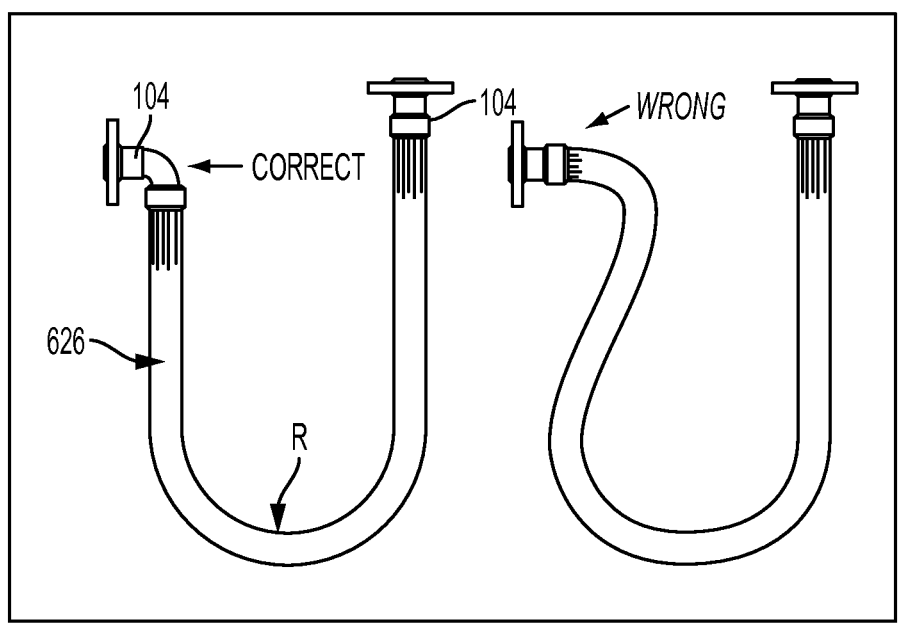
FIG. 18 is a schematic, elevation view of corrugated hose connecting fluid conduits in accordance with the present disclosure, as compared to a corrugated hose connection not in accordance with the present disclosure.

Another appropriate design for a U-shaped flexible hose is shown in FIG. 18, in which sharp bends of corrugated hose 626 are avoided in the exemplary "correct" orientation as compared to the exemplary "wrong" orientation containing such sharp bends. Moreover, the smallest bend radius R formed by corrugated hose 626 is illustratively greater than the minimum approved bend radius for the particular corrugated hose 626 used upon installation in conjunction with fuel dispensing facility 103.

Figure 19:
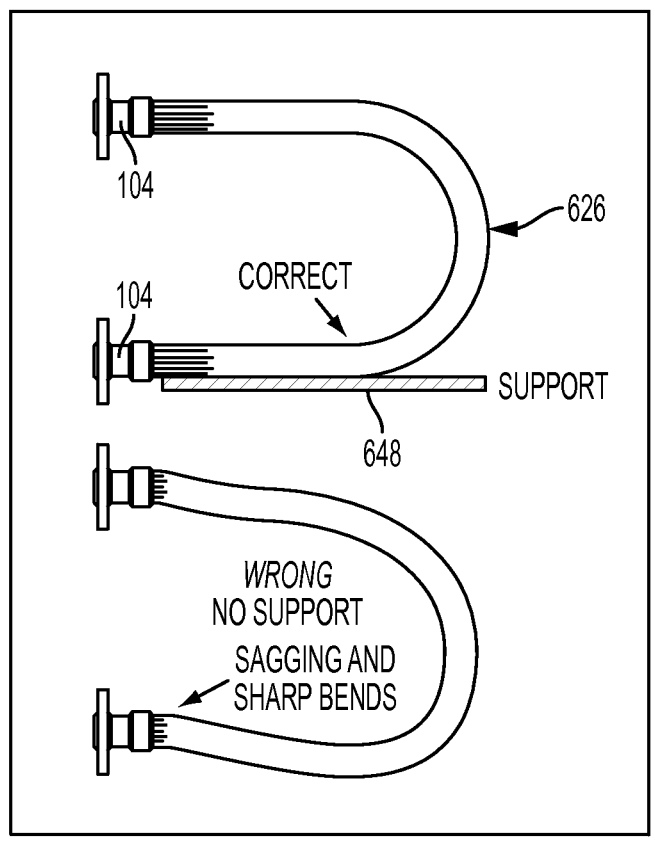
FIG. 19 is a schematic, elevation view of corrugated hose connecting fluid conduits in accordance with the present disclosure, as compared to a corrugated hose connection not in accordance with the present disclosure.

FIG. 19 shows yet another illustrative U-shaped arrangement of corrugated hose 626 connecting fuel lines 104. As illustrated, support surface 648 is employed underneath a bottom portion of a sideways "U-shaped" corrugated hose 626, such that the weight of hose 626 does not pull the "U" shape out of alignment. An exemplary correct orientation of hose 626 supported by support surface 648 is shown in the "correct" portion of FIG. 19, while an exemplary unsupported version is shown in the "wrong" portion of FIG. 19.

Figure 20:
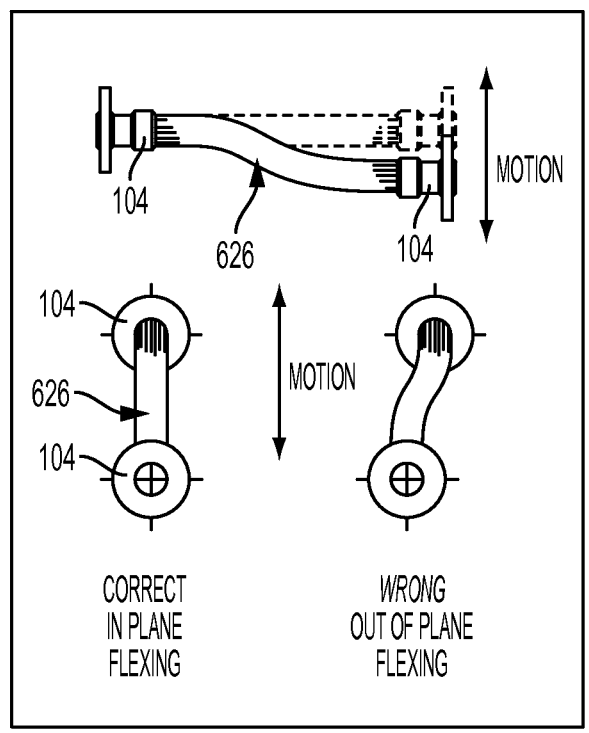
FIG. 20 is a schematic, elevation view of corrugated hose connecting fluid conduits in accordance with the present disclosure, as compared to a corrugated hose connection not in accordance with the present disclosure.

FIG. 20 illustrates another illustrative planar arrangement for the longitudinal axis of corrugated hose 626, in which hose 626 is used to join two fuel lines 104 with parallel but offset longitudinal axes. The exemplary "correct" portion of FIG. 20 illustrates an orientation of hose 626 and fuel lines 104 have longitudinal axes contained in a single plane, and an exemplary "wrong" portion of FIG. 20 illustrates an orientation in which the longitudinal axis of the hose does not lie in a single plane.

Figure 21:
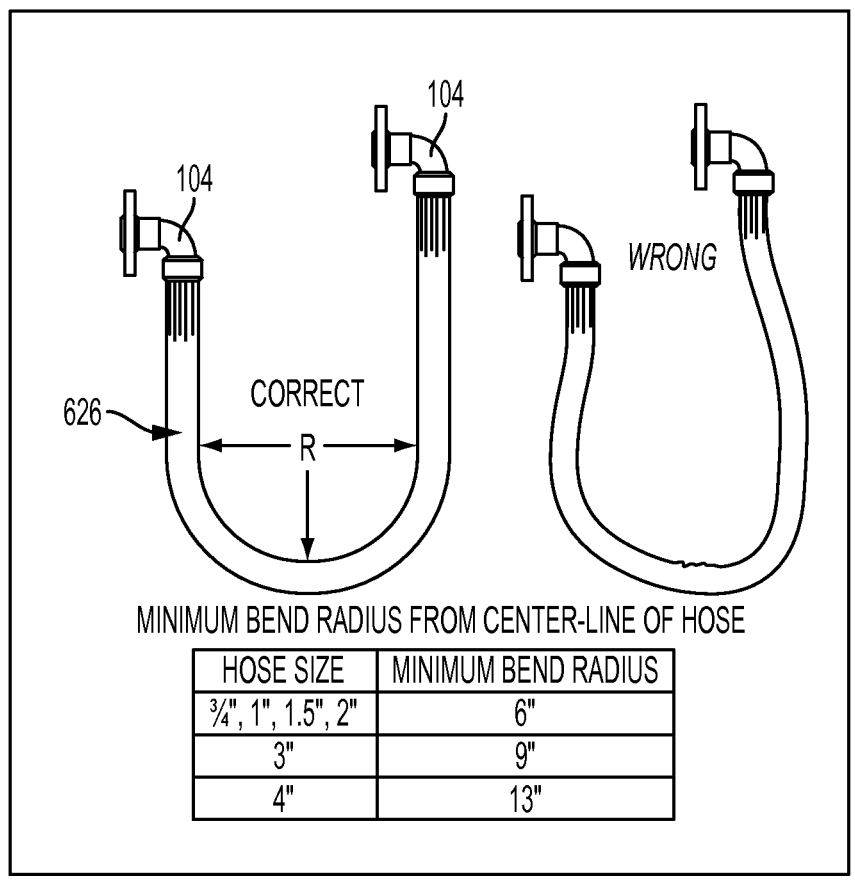
FIG. 21 is a schematic, elevation view of corrugated hose connecting fluid conduits in accordance with the present disclosure, as compared to a corrugated hose connection not in accordance with the present disclosure.

FIG. 21 is another depiction of corrugated hose 626 illustratively connecting to fuel lines 104, in which a correct minimum radius R is maintained throughout the axial extent of hose 626, as shown in the exemplary "correct" portion of FIG. 21 and in contrast with the exemplary "wrong" portion of FIG. 21 illustrating a bend radius less than the stated minimum.

FIGS. 22-27 illustrate exemplary design principles utilized in the installation of flexible conduit 701 during setup of fuel dispensing facility 103. In one exemplary embodiment, one or more of the illustrations provided in FIGS. 22-27 are provided on display 128 (FIG. 2). In an exemplary embodiment, flexible conduit 701 is a polyethylene pipework. In some exemplary embodiments, similar design principles are also used for weld pipes 702 and their associated junctions and connections. In one exemplary embodiment, verification that all of the design and installation principles of FIGS. 22-27 are stored as installation records 168 on memory 130 of console 102 (FIG. 2). In one embodiment, images of the actual installation are stored as part of the verifications.

Figure 22:
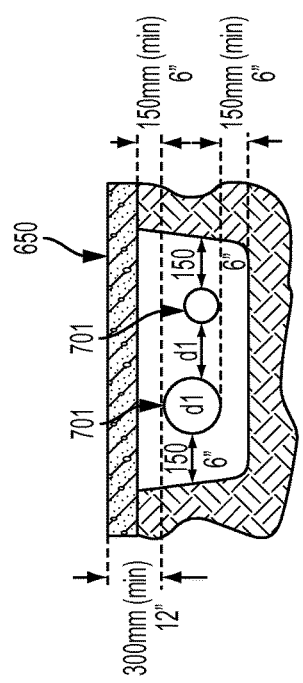
FIG. 22 is a cross-section, elevation view of spacing between flexible conduit used in the fuel dispensing facility shown in FIG. 6.

FIG. 22 illustrates an exemplary arrangement of flexible conduits 701 received within trench 650. As illustrated, a proper spacing of six inches between flexible conduits 701 and the adjacent trench wall is maintained, and a similar spacing d1 is provided between adjacent conduits 701. In one exemplary embodiment, d1 is six inches.

Figure 23:
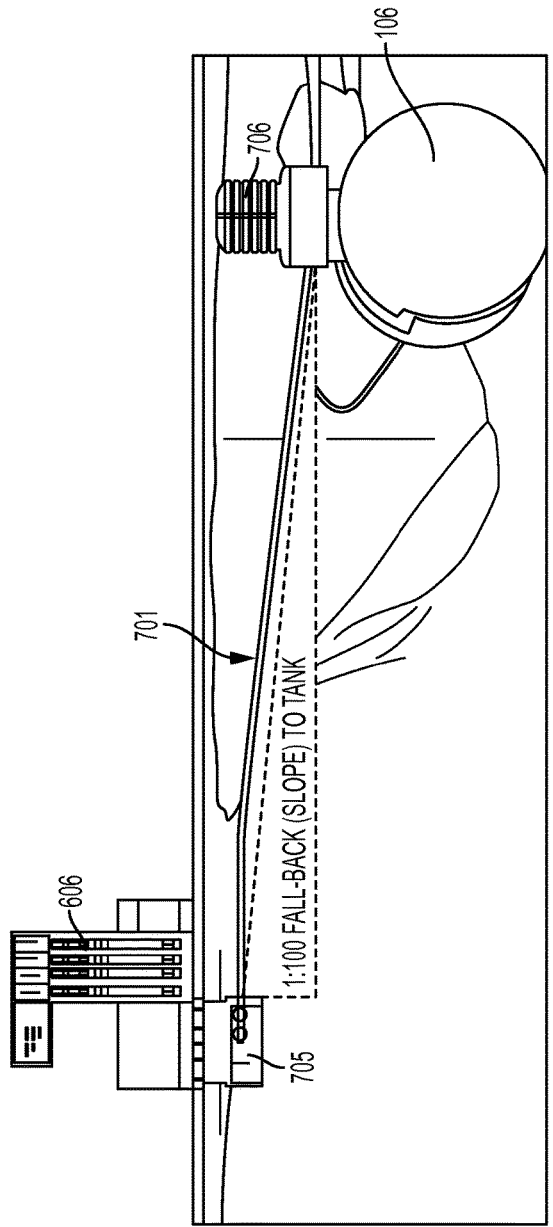
FIG. 23 is a perspective view of the flexible conduit shown in FIG. 22, shown extending from a fuel dispenser to a fuel storage tank in accordance with the present disclosure.

FIG. 23 illustrates an exemplary run of flexible conduit 701 from dispenser sump 705 of fuel dispenser 606 to tank sump 706 of fuel storage tank 106, in which flexible conduits 701 define a "fallback" or slope downwardly from sump 705 to sump 706 of at least 1%, i.e., flexible conduit 701 drops by one inch for every 100 inches of lateral travel between dispenser sump 705 and tank sump 706.

Figure 24:
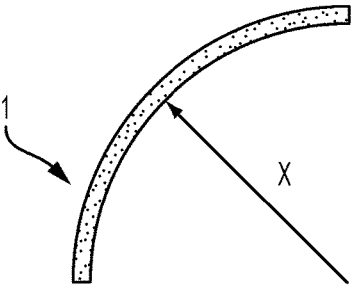
FIG. 24 is a schematic illustration of a bend in flexible conduit in accordance with the present disclosure.

FIG. 24 illustrates an exemplary minimum bend radius X for flexible conduit 701, and includes a schedule of exemplary minimum bend radii for various single wall, double wall, and UL 971 conduits of various sizes. In one exemplary embodiment, installations of fuel dispenser facility 701, flexible conduits 701 define a minimum bend radius X larger than the specified minimums provided in the tables of FIG. 24.

Figure 25:
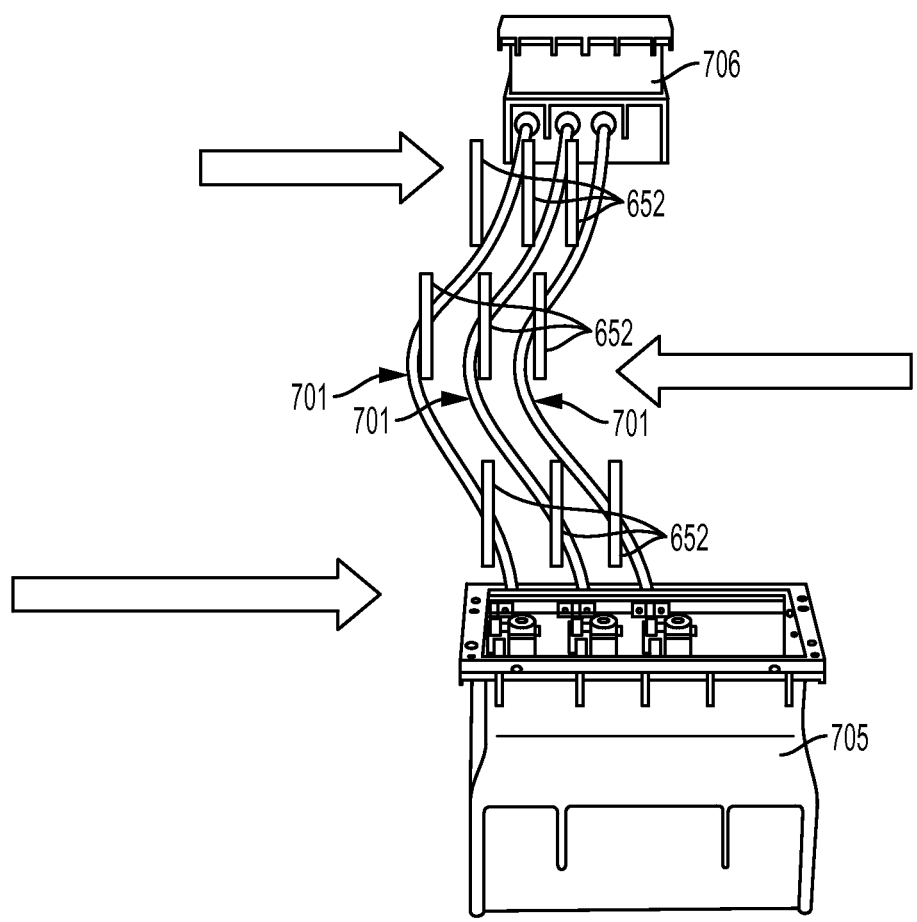
FIG. 25 is a perspective view of flexible conduit installed with an S-curve in accordance with the present disclosure.

Similarly, FIG. 25 illustrates lateral bending of exemplary flexible conduits 701 along an underground run between sumps 705 and 706 (or between any two points within fuel dispensing facility 103). In some embodiments, when installing flexible conduits 701 and fuel dispensing facility 103, flexible conduits 701 do not run straight from one sump to another sump but, rather, conduits 701 define sweeping curves as illustrated in FIG. 25. In some exemplary embodiments, when flexible conduits 701 are initially installed in an excavated area, stakes 652 are used to hold conduits 701 in the desired curved configuration until earthen backfill is filled in around conduits 701.

Figure 26:
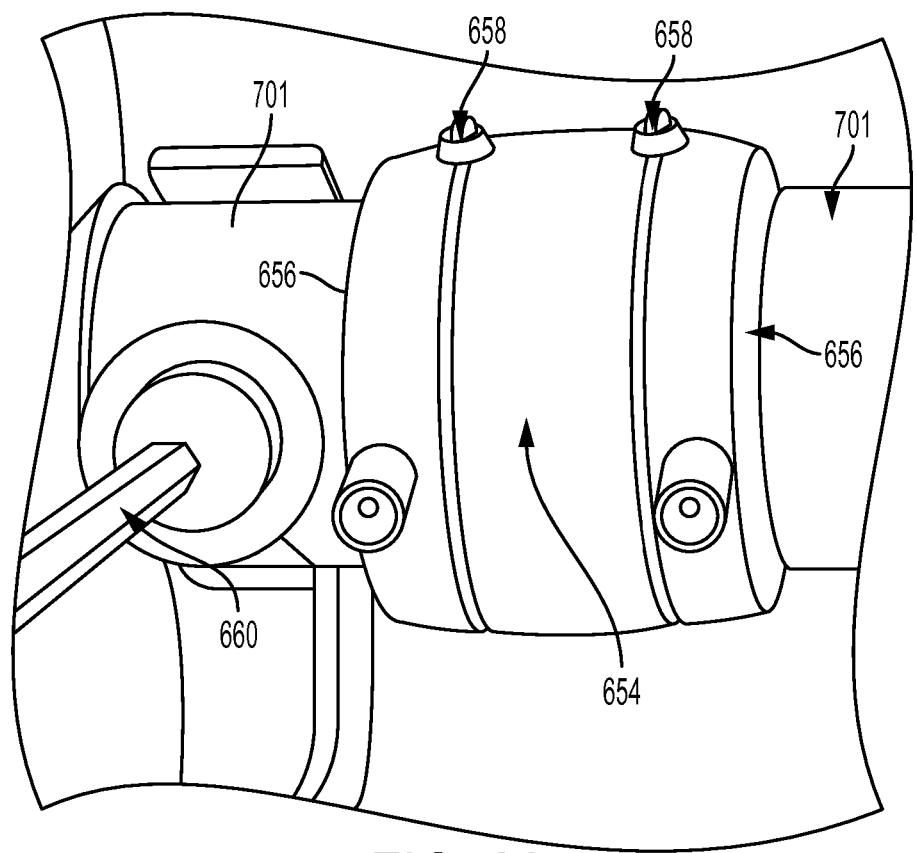
FIG. 26 is a perspective view of a welded joint between two flexible conduits in accordance with the present disclosure.

Turning now to FIG. 26, two exemplary flexible conduits 701 are shown joined by welding, including a pipe weld junction 654 to effect the same. In one exemplary embodiment, where weld junctions 654 are used in connection with fuel dispensing facility 103, proper depth markings 656 should be shown at the junction between each conduit 701 and weld junction 654 to visually confirm that flexible conduits 701 were fully received within weld junction 654 prior to welding. In addition, weld indicators 658, which pop or extend outwardly upon welding, should be shown in their popped out configuration for visual confirmation that a full and complete weld was performed. Further, both flexible conduits 701 should show visible signs of scraping along the outer surface of the pipe, and visible evidence that flexible conduits 701 were held in place by appropriate clamps 660 during the welding process should also be present. In one exemplary embodiment, individual tests are performed of each individual flexible conduit 701, and a form showing results of such testing is completed through installation module 220.

Figure 27:
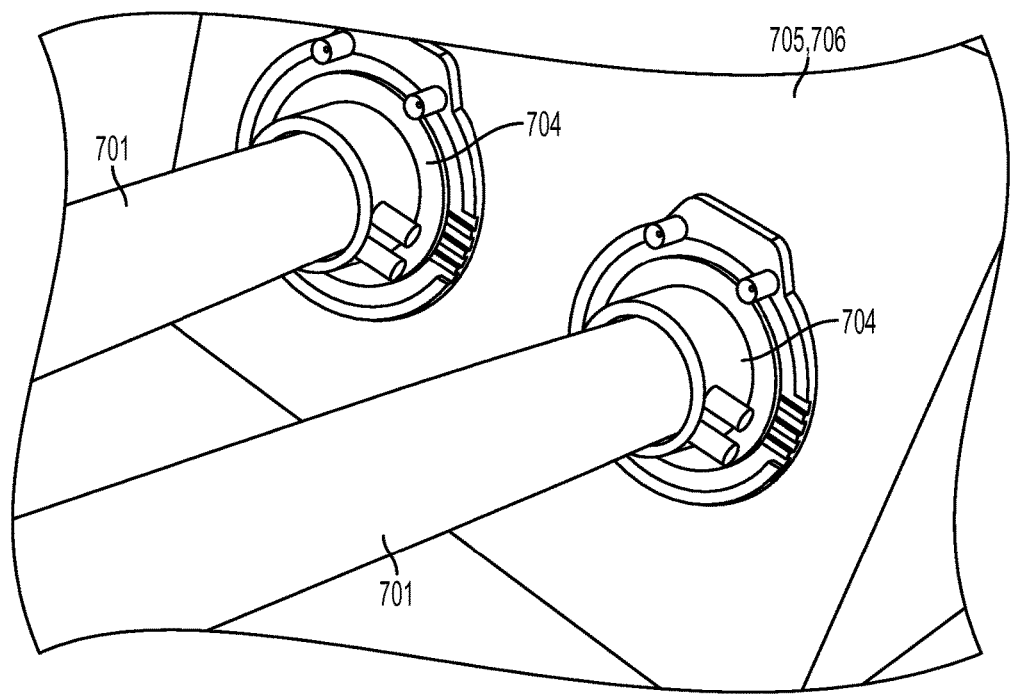
FIG. 27 is a perspective view of a junction between flexible conduit and a sump wall in the fuel dispensing facility of FIG. 6.

FIG. 27 is a perspective view of an exemplary junction between flexible conduits 701 and a sump wall of, e.g., dispenser sump 705 or tank sump 706. As noted above, entry boots 704 are illustratively used at this junction. In one exemplary embodiment, flexible conduits 701 enter sump 705 or 706 such that the longitudinal axis of flexible conduit 701 is substantially perpendicular to the wall of sump 705 or 706 at entry boot 704. In one exemplary embodiment, after installation of flexible conduits 701, testing for hydrostatic and/or vacuum containment of sump 705, 706 is performed, and forms indicating passage of these tests are completed through installation module 220.

Figure 28:
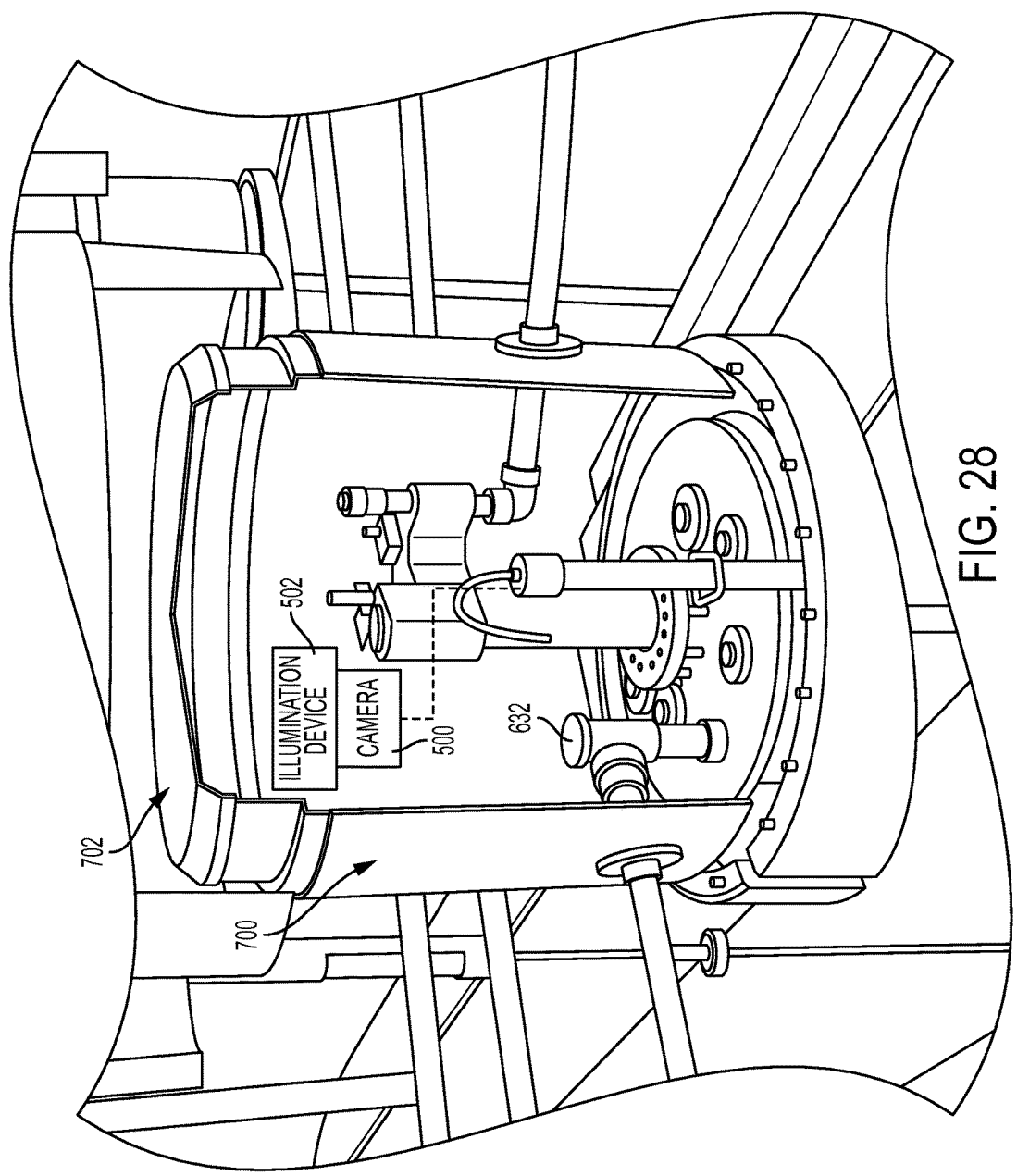
FIG. 28 is a perspective, partial section view an exemplary tank sump.
Figure 29:
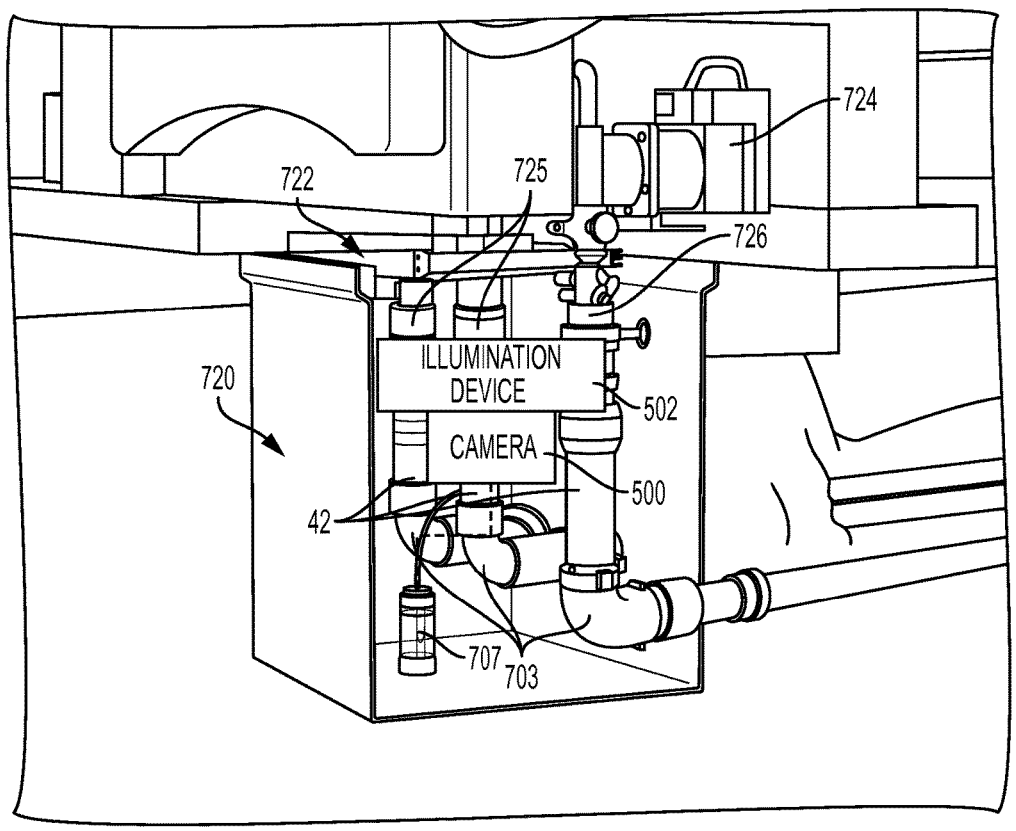
FIG. 29 is a perspective, partial section view of an exemplary dispenser sump.
Figure 29A:
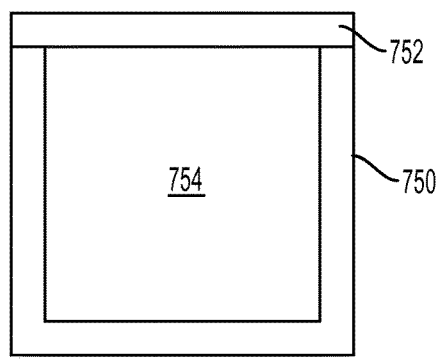
FIG. 29A is a representation of an exemplary sump.

Referring to FIG. 28, an exemplary tank sump 706 is shown. Referring to FIG. 29, an exemplary dispenser sump 705 is shown. Tank sump 706 and dispenser sump 705 are illustratively both part of an installation at an exemplary fuel dispensing facility. In one exemplary embodiment, the fuel dispensing facility includes a fuel delivery system having at least one underground storage tank configured to contain a fuel, at least one dispenser configured to receive the fuel from the at least one underground storage tank, and a fuel handling system which is configured to one of (1) deliver the fuel to the at least one underground storage tank, (2) receive the fuel from the at least one underground storage tank, (3) monitor for a leak within the fuel delivery system, and (4) monitor for a fuel inventory within the fuel delivery system. Tank sump 706 and dispenser sump 705 both illustratively include a sump base (see 750 of FIG. 29A) including at least one wall and a sump cover (see 752 of FIG. 29A) positioned over the sump base 750. The sump base 750 and the sump cover 752 cooperate to provide a sump interior 754. Exemplary sump covers include lids, dispensers 12, and other components of the fuel delivery system.

In one exemplary embodiment, respective sensors 708, 707 are positioned to monitor the respective sump interiors of tank sump 706 and dispenser sump 705 for an intrusion of a fluid into the sump interior. In an exemplary embodiment, respective cameras 500 are positioned to capture respective images of the respective sump interiors. In one exemplary embodiment, the camera 500 captures a first image at a first instance of time and a second image at a second instance of time, subsequent to the first instance of time. In another exemplary embodiment, the camera captures a plurality of images at a plurality of spaced apart time intervals. In a further exemplary embodiment, the camera 500 captures a first image at a first instance of time in response to the sensor 708 or probe 709 detecting the intrusion of the fluid into the sump interior.

In one exemplary embodiment, an illumination device 502 is positioned to illuminate the sump interior when the camera 500 captures the first image. The illumination device 502 illuminates the low light level area of the sump interior caused by the positioning of the sump cover. Exemplary illumination devices include LED lights, incandescent bulbs, and other suitable lighting devices. In one exemplary embodiment, the images captured by the camera 500 are communicated to a control system, such as console 102, operatively coupled to the fuel delivery system to monitor a status of the fuel delivery system. The control system illustratively includes a controller, a memory storing the image captured by the camera, and a user interface, wherein the controller provides through the user interface the image captured by the camera stored on the memory.

In one embodiment, the fuel delivery system includes another sensor monitoring an environmental characteristic of the sump. Exemplary environmental sensors include a pressure sensor, a temperature sensor, and other suitable environmental sensors. When the environmental sensor is associated with an interior of the sump, the camera may capture a first image in response to the environmental sensor detecting a change in the environmental characteristic. The console 102 may activate an alarm in response to the environmental sensor detecting the change in the environmental characteristic.

In one exemplary embodiment a method of monitoring a sump, such as tank sump 706 or dispenser sump 705, of a fuel delivery system is provided. The monitored sump includes a sump base including at least one wall and a sump cover positioned over the sump base. The sump base and the sump cover cooperate to provide a sump interior. The method comprising the steps of positioning a camera to capture an image of the sump interior while the sump cover is positioned over the sump base; capturing a first image of the sump interior with the camera; and sending the first image to a controller for viewing on a display. In one exemplary embodiment, the step of capturing the first image of the sump interior with the camera is performed in response to sensing a fluid intrusion into the sump interior. In another exemplary embodiment, the step of capturing the first image of the sump interior with the camera is performed in response to an expiration of a first time period.

In one exemplary embodiment, camera 500 is a video camera. In one exemplary embodiment, camera 500 is a still image camera. In one exemplary embodiment, the camera 500 is mounted to the respective sensor 707, 708. In one exemplary embodiment, camera 500 provides video or photographic (date/time-stamped) evidence of a watertight containment or to indicate water intrusion, prompting action. Camera 500 illustratively acts as a proxy for manual, visual inspections when configured to communicate images to console 102. In one exemplary embodiment, console 102 includes in its logic a scheduled event to 'take a photograph' or 'turn on/off video camera' at regular intervals. In one exemplary embodiment, the resultant images are stored in the memory of console 102 to provide historical evidence over time of compliance, and help narrow trouble-shooting should water intrusion occur.

Figure 30:
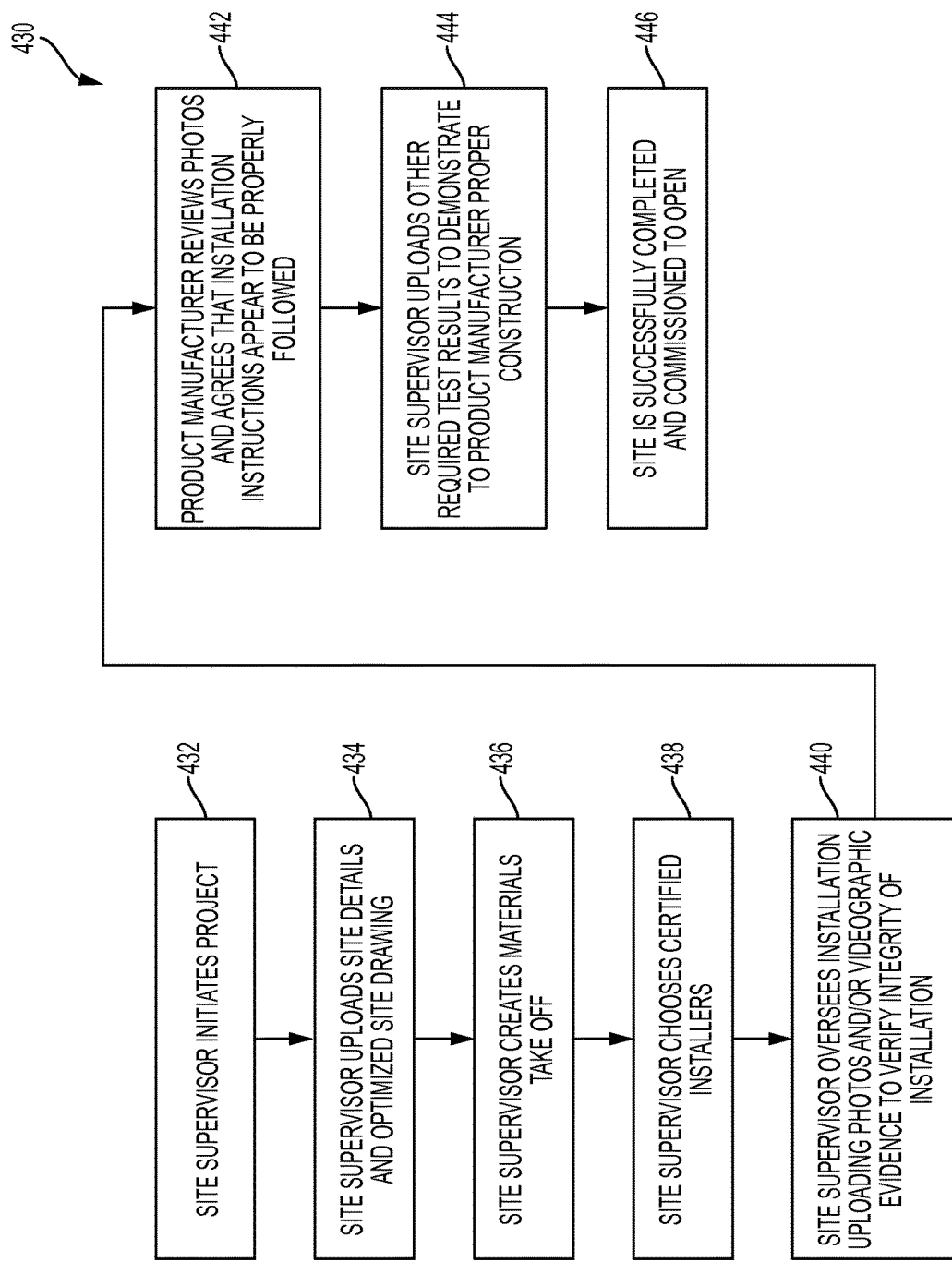
FIG. 30 illustrates an exemplary installation and verification process.

Referring next to FIG. 30, and exemplary installation and verification process 430 is illustrated. In the following illustration, first control system 200 (FIG. 4) is used by a site supervisor, project manager, or other individual or entity responsible for a design and/or construction of fuel dispensing facility 103 (FIG. 6) and second control system 300 (FIG. 4) is used by a product manufacturer of fuel handling system 160, an insurer of the product manufacturer of fuel handling system 160, or other individual or entity responsible for the supply of the components of fuel handling system 160. Of course, multiple first control systems 200 and second control system 300 may be utilized.

The site supervisor initiates a project on first control system 200, as represented by block 432 in FIG. 30. In one exemplary embodiment, the project is initiated through a web-based or mobile interface with first control system 200 (FIG. 4). The site supervisor then provides site details and site-drawings to memory 212 associated with first control system, as represented by block 434. The site supervisor next creates a Materials Take Off utilizing the materials module 240 (FIG. 4), as represented by block 436. As represented by block 438, the site supervisor selected certified installers for the construction of the project. During installation, the site supervisor periodically uploads photos and/or videos as images 216 and other installation data 218 to memory 212 (FIG. 4), as represented by block 440. The images 216 and other installation data 218 are communicated to input module 306 of second control system 300 (FIG. 4) and stored in memory 312 for the product manufacturer's review, as represented by block 442. If, upon reviewing the images 216 and installation data 218, the product manufacturer determines that the installation is not being performed properly, the product manufacturer may request addition evidence, such as additional images 216 or installation data 218, to verify that the installation is being performed properly. If the product manufacturer determines that the installation is being performed properly, the project proceeds. As represented in block 444, the site supervisor uploads other required test results as installation data 218 to the first control system 200 to demonstrate to the product manufacturer that proper construction was followed. As represented in block 446, once the product manufacturer verifies the installation data, such as using verification module 320 (FIG. 4), the site is successfully completed and commissioned to open.

Referring again to FIG. 4, exemplary information that may be stored as the installation record 168 in memory 170 accessible by console 102 of fuel dispensing facility 103, and/or in memory 168 of second control system 300 includes documents, drawings, photos, test results, and the like that are collected prior to and throughout installation. In some exemplary embodiments, this information includes one or more of the following: secondary containment monitoring, line leak detection, rules and configuration of tank gauge upon set up, installation photos, permits, regulatory reports, compliance reports. vacuum test, syphon jet test, third party mechanical tests, and approvals such as district, fire, water board, air permits, weights & measures, licenses, and the like.

In one exemplary embodiment, such information may be stored in remote memory 170 that is accessible by console 102 over networks 124 through a sever 172. such as a cloud server. In one exemplary embodiment, information associated with installation record 168 or maintenance/trouble-shooting of fuel dispensing facility 103 to be stored in memory 170 are uploaded to console 102 using USB, Bluetooth, or other suitable communication protocol. In one exemplary embodiment, information associated with installation record 168 or maintenance/trouble-shooting of fuel dispensing facility 103 are accessible for retrieval by trained or certified personnel via console 102. In a more particular embodiment, such information may be provided as a .cvs file, a .pdf file, or other suitable file extension type. In another more particular embodiment, console 102 provides email alerts and/or notices to a predetermined list of individuals based on one or more programmed activities.

In one exemplary embodiment, first control system 200 and/or second control system 300 is integrated as part of a total site asset management and reporting tool (FIG. 4). In one exemplary embodiment, first control system 200 and/or second control system 300 is integrated with an energy management system, such as for lighting. Memory 212 and/or memory 312 may illustratively include additional information not relating to the installation record 168. Additional information may include one or more of: images of hand-written station maintenance logs; photos or video files of changes to the fuel dispensing facility 103 over time such as forecourt, signage, dispersers, replaced manhole, repaired sump, nozzle replacement, filter replacement, and the like; incident issues; regulatory checks and/or logs; and revisions to programming configurations; and maintenance tracking via security access and service ticket dispatch records; an ability In some exemplary embodiments, the additional information may include an electronic daily checklist signed off by a store manager or other employee for recording daily duties such as sump inspections a visual check of hanging hardware, and the like. In some exemplary embodiments, the additional information may be segmented for restricting access to or for routing to a predetermined list of individuals. In some exemplary embodiments, memory 212, 312 is a secure storage mechanism, and a user can view information stored in memory 212, 312 through a mobile device. In one exemplary embodiment, a user can remotely view, add, edit, and otherwise management information stored in memory 212, 312 through a remote or mobile device.

In one exemplary embodiment, first control system 200 and/or second control system 300 includes or is communication with an electronic calendar. In a more particular embodiment, control systems 200, 300 generate one or more events or reminders for an user of the electronic calendar. Exemplary events and reminders include events and reminders for maintenance, preventative maintenance, regulator appointments, and license renewals, such as for a liquor license. In one exemplary embodiment, control systems 200, 300 generate one or more preventative maintenance events for assistance in planning purchases or repair or spare equipment or parts. In one exemplary embodiment, control systems 200, 300 provide a user with the ability to shut down or remotely shut down a particular fuel handling system 160 or fuel dispensing facility 103 if one or more events are not performed within a predetermined period of time. While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A sump for a fuel dispensing facility, the fuel dispensing facility including a fuel delivery system having at least one storage tank configured to contain a fuel, at least one dispenser configured to receive the fuel from the at least one storage tank, and a fuel handling system which is configured to one of (1) deliver the fuel to the at least one storage tank, (2) receive the fuel from the at least one storage tank, (3) monitor for a leak within the fuel delivery system, and (4) monitor for a fuel inventory within the fuel delivery system, the sump comprising:
  a sump base including at least one wall;
  a sump cover positioned over the sump base, the sump base and the sump cover cooperating to provide a sump interior;
  a sensor positioned to monitor the sump interior for an intrusion of a fluid into the sump interior;
  a camera positioned to capture an image of the sump interior; and a controller configured to provide the image to a user interface based on the sensor detecting the intrusion of the fluid into the sump interior.

2. The sump of claim 1, wherein the camera captures a first image at a first instance of time and a second image at a second instance image of time, the second instance of time being subsequent to the first instance of time.

3. The sump of claim 1, wherein the camera captures a plurality of images at a plurality of spaced apart time intervals.

4. The sump of claim 1, wherein the camera captures a first image at a first instance of time in response to the sensor detecting the intrusion of the fluid into the sump interior.

5. The sump of claim 1, wherein the controller is in communication with the sensor and an alarm, wherein the controller is configured to activate the alarm in response to the sensor detecting the intrusion of the fluid into the sump interior.

6. The sump of claim 1, further comprising a second sensor monitoring an environmental characteristic, wherein the camera captures a first image in response to the second sensor detecting a change in the environmental characteristic.

7. The sump of claim 6, wherein the controller is in communication with the second sensor and an alarm, wherein the controller is configured to activate the alarm in response to the second sensor detecting the change in the environmental characteristic.

8. The sump of claim 1, further comprising an illumination device positioned to illuminate the sump interior when the camera captures the image.

9. The sump of claim 1, wherein the image captured by the camera is communicated to a control system operatively coupled to the fuel delivery system, the control system monitoring a status of the fuel delivery system, the control system including:
the controller,
a memory storing the image captured by the camera, and
the user interface, wherein the controller provides through the user interface the image captured by the camera stored on the memory.

10. A method of monitoring a sump of a fuel delivery system, the sump including a sump base including at least one wall and a sump cover positioned over the sump base, the sump base and the sump cover cooperating to provide a sump interior, the method comprising the steps of:
positioning a camera to capture an image of the sump interior while the sump cover is positioned over the sump base;
capturing a first image of the sump interior with the camera; and
sending the first image to a controller for viewing on a display based on sensing a fluid intrusion of a fluid into the sump interior.

11. The method of claim 10, wherein the step of capturing the first image of the sump interior with the camera is performed in response to sensing the fluid intrusion into the sump interior.

12. The method of claim 11, further comprising activating an alarm in response sensing the fluid intrusion of the fluid into the sump interior.

13. The method of claim 10, wherein the step of capturing the first image of the sump interior with the camera is performed in response to an expiration of a first time period.

14. The sump for a fuel dispensing facility of claim 9, wherein the memory further includes at least one record selected from an installation record of the fuel dispensing facility and a maintenance record of the fuel dispensing facility.

15. The sump for a fuel dispensing facility of claim 14, wherein the controller is in communication with the sensor and an alarm, wherein the controller is configured to activate the alarm in response to the sensor detecting the intrusion of the fluid into the sump interior, the alarm being configured to provide the at least one record to a predetermined user upon activation of the alarm.

16. The sump for a fuel dispensing facility of claim 15, wherein the at least one record comprises one or more images of the fuel delivery system.

17. The sump for a fuel dispensing facility of claim 15, wherein the at least one record includes an installation record.

18. The sump for a fuel dispensing facility of claim 17, wherein the installation record includes an image of a first portion of the fuel delivery system, the first portion of the fuel delivery system being identified by the controller as related to the alarm.

19. The sump for a fuel dispensing facility of claim 17, wherein the at least one record further includes a maintenance record.

20. The sump of claim 1, wherein the camera captures a plurality of images, each taken at a regular interval.

21. A method of monitoring a sump of a fuel delivery system, the sump including a sump base including at least one wall and a sump cover positioned over the sump base, the sump base and the sump cover cooperating to provide a sump interior, the method comprising the steps of:
positioning a camera to capture an image of the sump interior while the sump cover is positioned over the sump base;
capturing a first image of the sump interior with the camera; and
sending the first image to a controller positioned external to the sump interior based on sensing a fluid intrusion of a fluid into the sump interior.

* * * * *